(12) United States Patent
Uesaka

(10) Patent No.: US 12,440,221 B2
(45) Date of Patent: Oct. 14, 2025

(54) APPLICATOR, CLIP SYSTEM, AND RELATED METHOD OF OPERATION

(71) Applicant: OLYMPUS MEDICAL SYSTEMS CORP., Tokyo (JP)

(72) Inventor: Kensuke Uesaka, Hino (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 416 days.

(21) Appl. No.: 18/175,033

(22) Filed: Feb. 27, 2023

(65) Prior Publication Data
US 2023/0270446 A1 Aug. 31, 2023

Related U.S. Application Data

(60) Provisional application No. 63/363,078, filed on Apr. 15, 2022, provisional application No. 63/268,632, filed on Feb. 28, 2022.

(51) Int. Cl.
| | | |
|---|---|---|
| *A61B 17/128* | (2006.01) | |
| *A61B 17/122* | (2006.01) | |
| *A61B 90/00* | (2016.01) | |

(52) U.S. Cl.
CPC ........ *A61B 17/1285* (2013.01); *A61B 17/122* (2013.01); *A61B 2090/034* (2016.02)

(58) Field of Classification Search
CPC ..... A61B 17/083; A61B 17/10; A61B 17/122; A61B 17/1285; A61B 2017/0034; A61B 2090/034; A61B 2090/037
See application file for complete search history.

(56) References Cited

U.S. PATENT DOCUMENTS 8,480,685 B2 * 7/2013 Kimura .............. A61B 17/1285
606/139
2007/0112359 A1 5/2007 Kimura et al.

FOREIGN PATENT DOCUMENTS

| JP | 2009538699 | 11/2009 |
|---|---|---|
| JP | 2015163222 | 9/2015 |

(Continued)

OTHER PUBLICATIONS

"Japanese Application Serial No. 2023-030459, Office Action dated Jan. 16, 2024", w English Translation, (Jan. 16, 2024), 4 pgs.

*Primary Examiner* — Ryan J. Severson
(74) *Attorney, Agent, or Firm* — Schwegman Lundberg & Woessner, P.A.

(57) ABSTRACT

A system, comprises a sheath, an operation body attached to the sheath, the operation body including a first wall, a clip configured to be inserted in and protruded from the sheath, the clip including a pair of arms, a wire inserted in the sheath, the wire including a first end and a second end, the first end attached to the clip, a handle attached to the second end and configured to move the wire against the operation body, the handle configured to open and close the pair of arms via the wire, and an obstruction attached to the wire and configured to generate a sliding resistance to the wire. The handle is configured to change a configuration of the clip between a first configuration and a second configuration. In the first configuration, the obstruction and the wire are placed in a relative position, the handle opens the arms, and the obstruction contacts the first wall. In the second configuration, the obstruction and the wire maintain the relative position, the handle closes the arms, and the obstruction is spaced apart from the first wall.

20 Claims, 17 Drawing Sheets

(56) References Cited

FOREIGN PATENT DOCUMENTS

| WO | WO-2006062019 A1 | 6/2006 |
| WO | 2007142977 | 12/2007 |
| WO | 2020136701 | 7/2020 |
| WO | WO-2021172544 A1 | 9/2021 |

* cited by examiner

APPLICATOR, CLIP SYSTEM, AND RELATED METHOD OF OPERATION

RELATED APPLICATION DATA

This application is based on and claims priority under 37 U.S.C. § 119 to U.S. Provisional Application No. 63/268,632 filed on Feb. 28, 2022, and No. 63/363,078 filed on Apr. 15, 2022, the entire contents of which are incorporated herein by reference.

FIELD OF DISCLOSURE

The present disclosure relates to a clip system, an applicator, and a method of operation a clip system.

BACKGROUND

In endoscopic treatment, a clip apparatus can be used in support of ligating an excised portion of tissue, such as after a treatment or in relation to performing hemostasis operation. The clip apparatus can include a clip for gripping tissue, and a retaining tube such as for receiving and locking the clip in a specified state. The clip apparatus can be introduced to the treatment position by an applicator through which a channel of an endoscope can be inserted.

In one approach, a clip apparatus can include a clip having a self-expanding force biased such as to be in an open state. The user can actuate the clip to establish the open state and grip a cut-out tissue portion or the like then the clip, retaining the cut-out portion or the like, can be restrained by a holding tube, locking the clip to the closed state.

In another approach, a cartridge system can be used, such as to reload a clip apparatus into an applicator (introduction device). Using the cartridge system, the user can reload the clip apparatus by exposing a connector that has been extended to a position distally protruding from the sheath of the applicator (hereinafter also referred to as a "clip loading position").

SUMMARY

In the clip system described in International Publication No. WO 2021/172544, for example, when the clip is placed in the open state to grip excised tissue, such as after having been previously closed upon the tissue, a connector portion of the applicator can be unintentionally moved to a position where the clip apparatus may be detached from the connector portion in an unwanted manner.

To address such a challenge, the present subject matter can include a clip system, an applicator, and a method of operating a clip system. Such a clip system can be reloadable and easy to operate such as allowing gripping, release, or re-gripping, and suppressing unwanted detachment of a clip during manipulation.

A clip system according to disclosure includes a sheath, an operation body attached to the sheath, the operation body including a first wall, a clip configured to be inserted in and protruded from the sheath, the clip including a pair of arms, a wire inserted in the sheath, the wire including a first end and a second end, the first end attached to the clip, a handle attached to the second end and configured to move the wire against the operation body, the handle configured to open and close the pair of arms via the wire, and an obstruction attached to the wire and configured to generate a sliding resistance to the wire. The handle is configured to change a configuration of the clip between a first configuration and a second configuration. In the first configuration, the obstruction and the wire are placed in a relative position, the handle opens the arms, and the obstruction contacts the first wall. In the second configuration, the obstruction and the wire maintain the relative position, the handle closes the arms, and the obstruction is spaced apart from the first wall.

An applicator includes a sheath, an operation body attached to the sheath, the operation body including a first wall, a wire inserted in the sheath, the wire including a first end and a second end, a handle attached to the second end and configured to move the wire against the operation body, the handle configured to move the wire forward and backward with respect to the sheath; and an obstruction attached to the wire and configured to generate a sliding resistance to the wire. The handle is configured to change a configuration of the applicator between a first configuration and a second configuration. In the first configuration, the obstruction and the wire are placed in a relative position, the handle opens the arms, and the obstruction contacts the first wall. In the second configuration, the obstruction and the wire maintain the relative position, the handle closes the arms, and the obstruction is spaced apart from the first wall.

An operation method of using a treatment tool according to disclosure, the method includes moving a wire and a first clip attached to the wire distally in a sheath, protruding the first clip from the sheath, opening a pair of arms of the first clip while an obstruction contacts a first wall of an operation portion, the obstruction attached to the wire. The obstruction and the wire are placed in a relative position. The method comprises closing the pair of arms while the obstruction is spaced apart from the first wall of the operation body. The obstruction and the wire are maintained in the relative position.

The operation methods of the clip system, applicator and clip system of the present subject matter are re-loadable and easy to manipulate such as support release and re-gripping operations.

FORM FOR CARRYING OUT EXAMPLES OF THE PRESENT SUBJECT MATTER

Detailed Description

First Embodiment

A clip delivery device 300 according to a first embodiment of the present subject matter will be described with reference to FIGS. 1 to 13.
[Clip Delivery Device 300]

The clip delivery device (clip system) 300 includes a clip introducing apparatus (applicator) 200 and a clip apparatus 1. The clip apparatus 1 is loaded into the clip introducing device 200.
[Clip Introducer 200]

Figure 1:
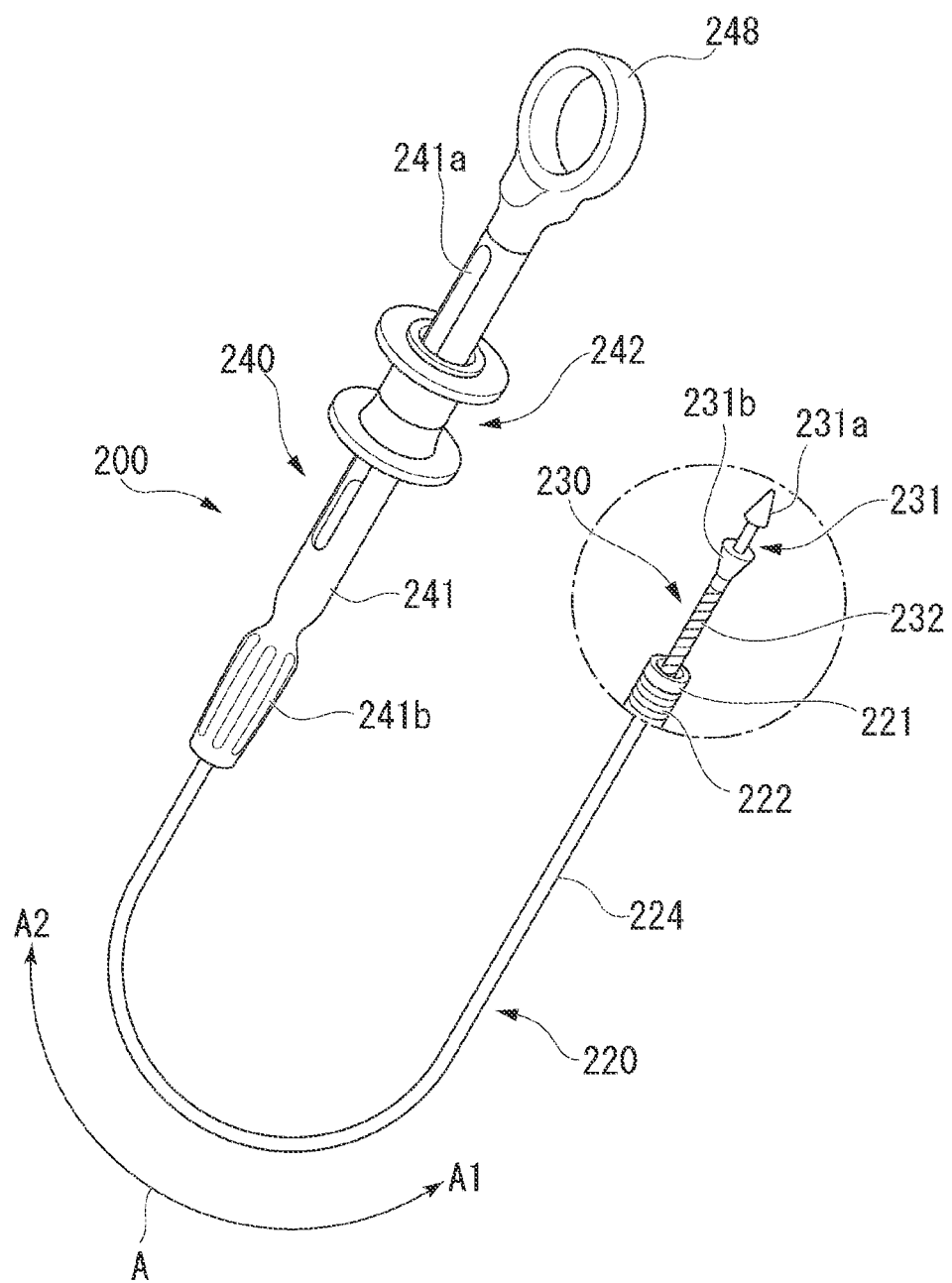
FIG. 1 is a diagram showing an example of a clip introducing apparatus of a clip delivery device according to a first embodiment.

FIG. 1 is a diagram showing a clip introducing apparatus 200.

The clip introducing device 200 is a device for introducing the clip 2 of the clip apparatus 1 into the body. The clip introducing apparatus 200 includes a sheath 220, a manipulation wire 230, and an operation unit 240.

In the following description, the clip apparatus 1 side in the longitudinal direction A of the clip delivery device 300 is defined as the distal end side (distal side) A1 of the clip delivery device 300, and the operation unit (operation portion or operation body) 240 side of the clip introduction device 200 is defined as the proximal end side (proximal side) A2 of the clip delivery device 300.

The clip introduction device 200 is inserted into a treatment instrument insertion channel of an endoscope, for example, and is used in combination with an endoscope. Therefore, the sheath 220 is generally longer than a length of the treatment instrument insertion channel of the endoscope. The sheath 220 is generally flexible and curves to conform to the curvature of the insertion portion of the endoscope.

Sheath 220 includes a tip 221, a distal end coil 222, and a proximal coil 224, and is formed in an elongated tubular shape. The distal coil 222 is disposed on the distal side A1 of the sheath 220. Tip 221 is disposed at the distal end of the distal end coil 222.

Figure 2:
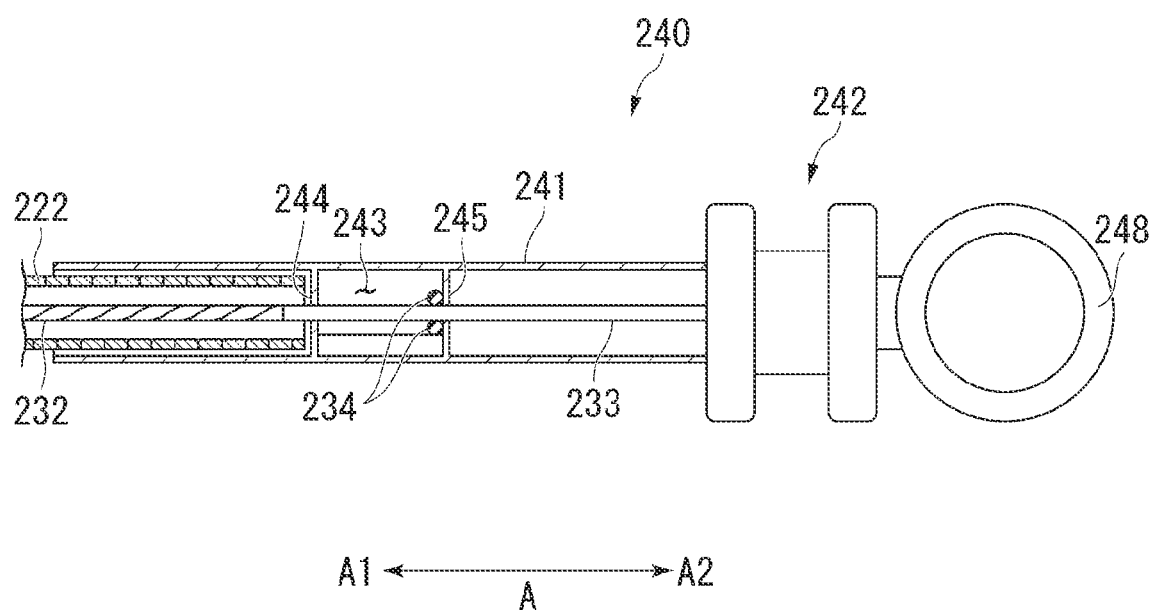
FIG. 2 is a cross-sectional view of an example comprising an operation unit of the clip introducing device.

FIG. 2 is a cross-sectional view of the operation unit 240.

As shown in FIGS. 1 and 2, operation wire (force transmitter member) 230 comprising a conical retainer connected to the clip apparatus 1 (connection portion) 231, a wire 232 for operating the conical retainer 231, a cylinder 233 attached to the proximal end of the wire 232, and an O-ring (obstruction) 234.

The conical retainer (distal end portion) 231 includes an engagement portion 231*a* having a conical shape for engaging with the clip apparatus 1, and a wire connection portion 231*b* provided at the proximal end of the engagement portion 231*a*. Conical retainer 231 can be formed of a metal material such as, for example, stainless steel.

Wire (first force transmitter member) 232 is inserted in a retractable manner with respect to the sheath 220. The distal end of the wire 232 is fixed to the proximal end of the wire connecting portion 231*b*, for example by welding.

Cylinder (second force transmitter member) 233 is formed in a cylindrical shape by a metal or the like, it is attached to the proximal outer peripheral portion of the wire 232.

O-ring (sliding member) 234 is a ring member formed of an elastic material, and slidably mounted along the longitudinal direction A on the outer peripheral portion of the cylinder (second force transmitter member) 233. The inner diameter of the O-ring 234 is substantially equal to the outer diameter of the outer peripheral portion of the cylinder 233. The force amount per unit length necessary to slide the O-ring 234 along the outer peripheral portion of the cylinder 233 in the longitudinal direction A can be defined as a "first force amount", a plurality of O-rings (sliding member) 234 may be slidably attached to the outer peripheral portion of the cylinder 233. The first force amount may be adjusted flexibly and easily to provide specified resistance, such as by using a plurality of O-ring structures, or other structures having suitable dimensions, or otherwise suitable materials. A shape of the O-ring 234 is merely an example and other compliant structures can be used, such as having a C-shape, for example, such as to aid in simplifying installation, modification, or replacement of such structures.

As shown in FIG. 1, the operation unit (handle) 240 includes an operation unit main body 241, a slider 242, and a thumb ring (handle) 248. The operation unit main body 241 is injection molded of, for example, a resin material. The operation unit main body 241 includes a slit portion 241*a* and a rotary grip 241*b* on the distal end side. The slit portion 241*a* supports the slider 242 such as to be able to move forward and backward. The handle may include one or more of the unit main body 241, the slider 242 that is configured to connect the wire 232 or 233 and to operate the wire 232 or 233.

As shown in FIG. 2, operation unit body 241 has an internal space 243 extending along the longitudinal direction A. The inner space 243 is retractably inserted the cylinder 233 into the longitudinal direction A, and O-ring 234 is disposed on the outer peripheral portion of the cylinder 233 inserted the internal space.

As shown in FIG. 2, slider 242 is retractably mounted in the longitudinal direction A with respect to the operation unit body 241, is attached on the proximal end of the wire 232. As the slider 242 moves forward and backward in the longitudinal direction A, the wire 232 moves forward and backward with respect to the sheath 220, and the conical retainer 231 moves forward and backward.

Internal space 243 has a first locking portion 244 on the distal end side A1, and a second locking portion 245 on the proximal end side A2. O-ring 234 is placed between a first locking portion 244 and a second locking portion 245. The first locking portion 244 pass through the cylinder 233 without passing through the O-ring 234. For example, a first wall of the inner space 243 is formed to pass through the cylinder 233. The second locking portion 245 pass through the cylinder 233 without passing through the O-ring 234. For example, a first wall of the inner space 243 is formed to pass through the cylinder 233.

Even when the slider 242 is moved back and forth along the longitudinal direction A, the cylinder 233 has a sufficient length to pass through the first locking portion 244 and the second locking portion 245 of the inner space 243. Therefore, the cylinder 233 passing through the internal space 243 is constrained regardless of the advancing/retracting position of the slider 242. If the wire 232 is constrained, the operation wire (force transmitter member) 230 may not have a cylinder 233. The first wall 244 and second wall 245 are located inside the operation body 240 and spaced apart in a longitudinal axis direction A of the sheath 220. The obstruction 234 is placed at a space 243 between the first wall 244 and second wall 245. An amount of movement of the wire 232 and/or 234 from the first configuration (FIG. 10) to the second configuration (FIG. 1*l*) relative to the sheath 220 in the longitudinal axis direction A can be substantially equal to a length of the space 243 in the longitudinal axis direction A. Substantially equal can include design errors and the range in which the same effect can be achieved as in the present application. The amount of movement of the wire 232 and/or 234 can be shorter than the length of the space 243.

Thumb ring 248 is rotatably mounted on the proximal end side of the operation unit body 241 about the longitudinal axis of the operation unit body 241.

The operation body 240 is attached to the sheath 220, the operation body 240 includes a first wall 244 and a second wall 245. The clip 2 is configured to be inserted in and protruded from the sheath 220, the clip includes the pair of arms 21. The wire 232 is inserted in the sheath 220, the wire 232 includes a first end and a second end, the first end is attached to the clip 2. The handle 248 is attached to the second end and is configured to move the wire 232 against the operation body 240, the handle 248 is configured to open and close the pair of arms 21 via the wire 232. The handle 248 is configured to move the wire 232 forward and backward with respect to the sheath 220. The obstruction 234 attached to the wire 232 and is configured to generate a sliding resistance to the wire 232. The handle 248 may be configured to change a configuration of the clip 2 between a first configuration and a second configuration. In the first configuration, the obstruction 234 and the wire 232 are placed in a relative position, the handle 248 opens the arms 21, and the obstruction 234 contacts the first wall 244, and in the second configuration, the obstruction 234 and the wire 232 maintain the relative position, the handle 248 closes the arms 21, and the obstruction 234 is spaced apart from the first wall 244. In the second configuration, the obstruction 234 is spaced apart from the second wall 245 or contacts the second wall 245. The wire 232 may include the cylinder 233. The handle 248 may be configured to change a configuration of the applicator 200 between a first configuration and a second configuration. In the first configuration, the obstruction 234 and the wire 232 are placed in a relative position, and the obstruction 234 contacts the first wall 244, and in the second configuration, the obstruction 234 and the wire 232 maintain the relative position, and the obstruction 234 is spaced apart from the first wall 244. In the second configuration, the obstruction 234 is spaced apart from the second wall 245 or contacts the second wall 245.

[Clip Apparatus 1]

Figure 3:
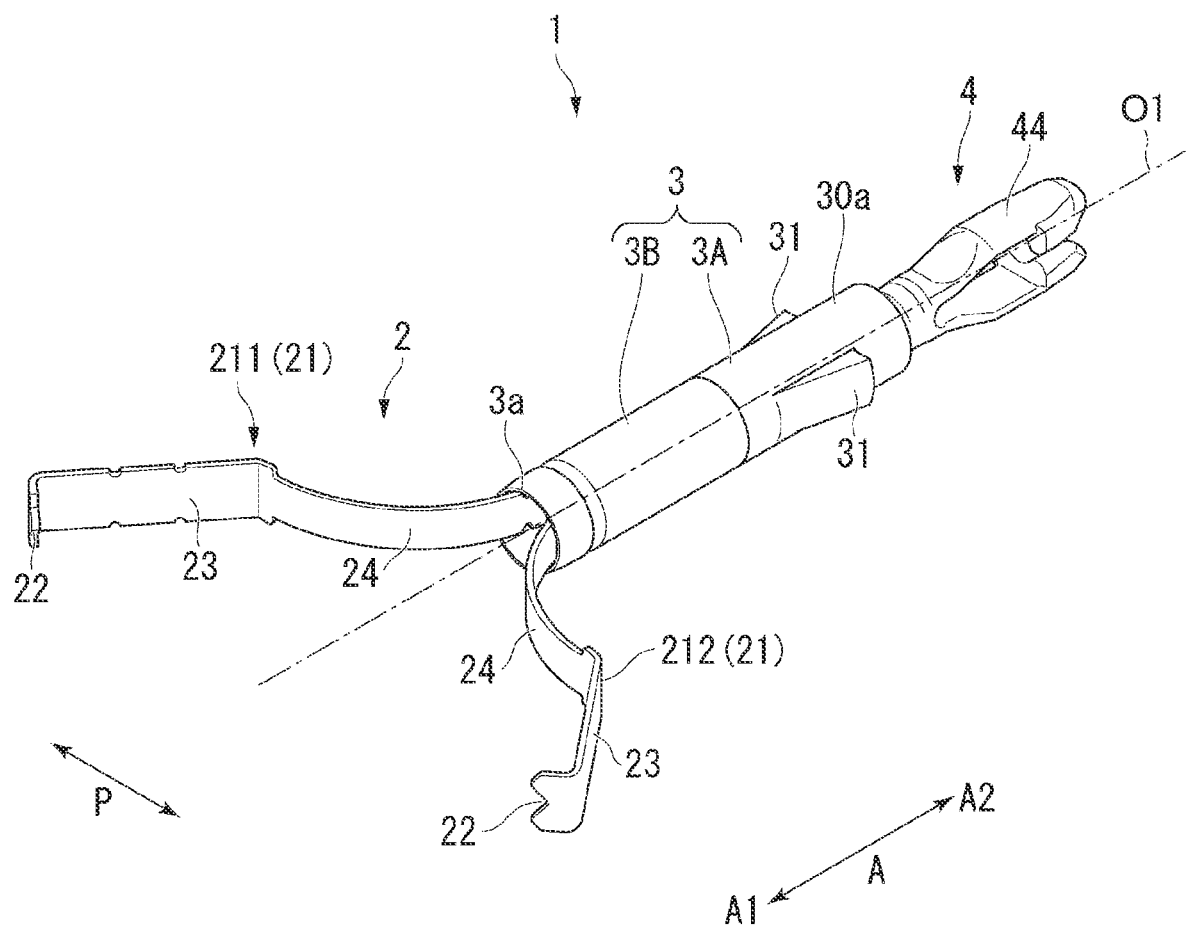
FIG. 3 is a perspective view of an example comprising a clip apparatus of the clip delivery device.
Figure 4:
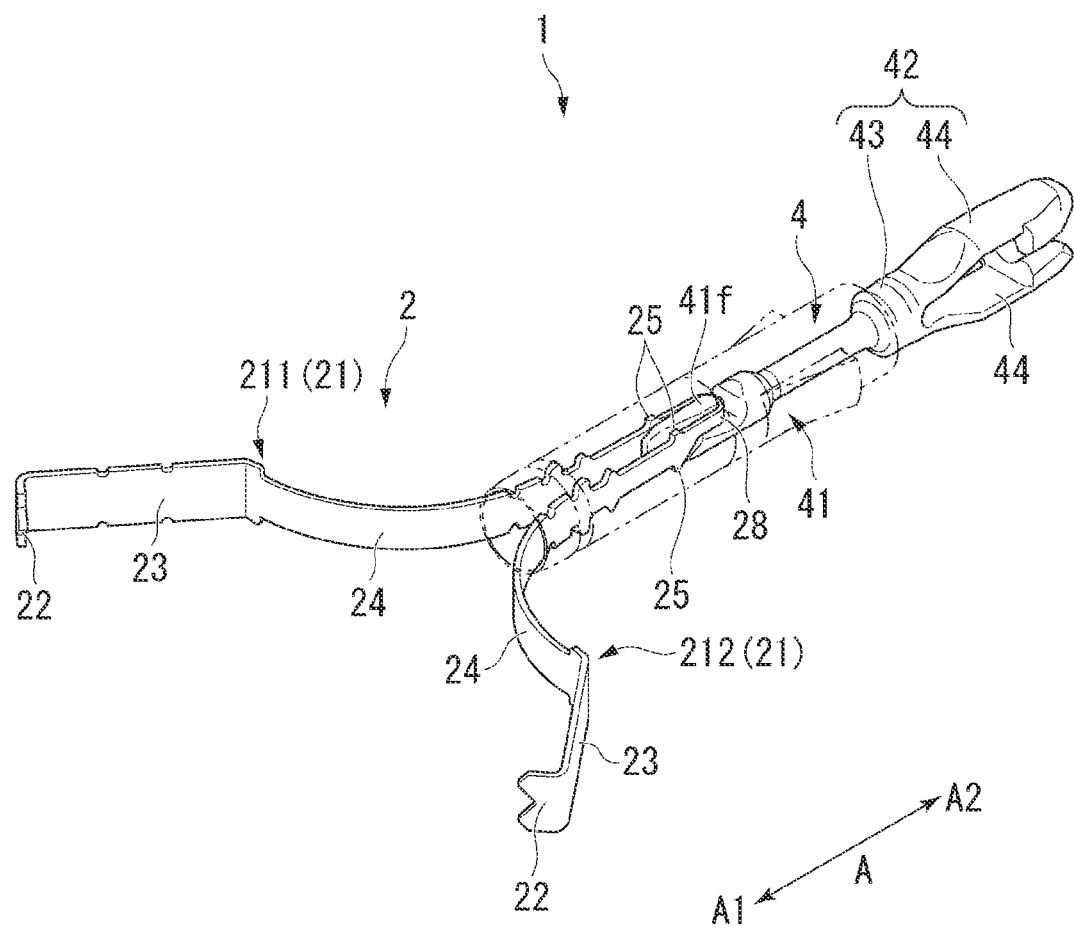
FIG. 4 is a perspective view of an example comprising the clip apparatus which is transmitted and displayed pressing member.

FIG. 3 is a diagonal view of the clip apparatus 1. FIG. 4 is a perspective view of the clip apparatus 1 in which the holding member 3 is displayed in a transparent manner. The clip apparatus 1 includes a clip 2, a holding member 3, and a connector 4.

Clip 2 is formed a metal plate bended at a central portion. Clip 2 has a pair of arms 21 which can be opened and closed, and a proximal end portion 28 for connecting the pair of arms 21. The proximal end A2 of the clip 2 is inserted into the inner space 38 of the holding member 3.

A pair of arms 21 has a first arm 211 and the second arm 212. The first arm 211 and the second arm 212 is disposed symmetrically with respect to the central axis O1 in the longitudinal direction A of the clip apparatus 1. The clip 2 may have three or more arms.

The first arm 211 has a tissue gripping portion 22, a flat gripping portion 23, a sliding portion 24, and an engaging portion 25 from the distal end side A1 toward the proximal end side A2. The tissue gripping portion 22 is formed by bending the tip of the first arm 211 to O1. Sliding portion 24 is a portion where the pair of arms 21 is elastically deformed when retracted to the holding member 3.

The second arm 212 has a tissue gripping portion 22, a flat gripping portion 23, a sliding portion 24, and an engaging portion 25 from the distal end side A1 toward the proximal end side A2.

The tissue gripping portion 22 of the first arm 211 and the tissue gripping portion 22 of the second arm 212 are formed in a shape asymmetric with respect to the central axis O1. Therefore, when attaching the clip 2 to the connector 4, the user can easily grip the direction in which the clip 2 is attached to the connector 4.

Engagement portion 25 is a member engageable with the clamping member 32 of the holding member 3. Tip side A1 of the engaging portion 25 establishes an obtuse slope with respect to the longitudinal direction A, the proximal end side A2 establishes an acute slope with respect to the longitudinal direction A.

A proximal end 28 connects the first arm 211 and the second arm 212. The first arm 211 and the second arm 212 connected by the proximal end portion 28 is provided toward the distal end side A1 and can be opened. The proximal end portion 28 is formed in a U-shape and is connected to the hook 41*f* of the connector 4. The proximal end portion 28 is biased so that the pair of arms 21 is in the open state. Therefore, the pair of arms 21 of the clip 2 has a self-expanding force with respect to the opening and closing direction P.

As shown in FIG. 4, the hook 41*f* of the connector 4 is inserted and connected to the base end portion 28 formed in a U-shape.

Figure 5:
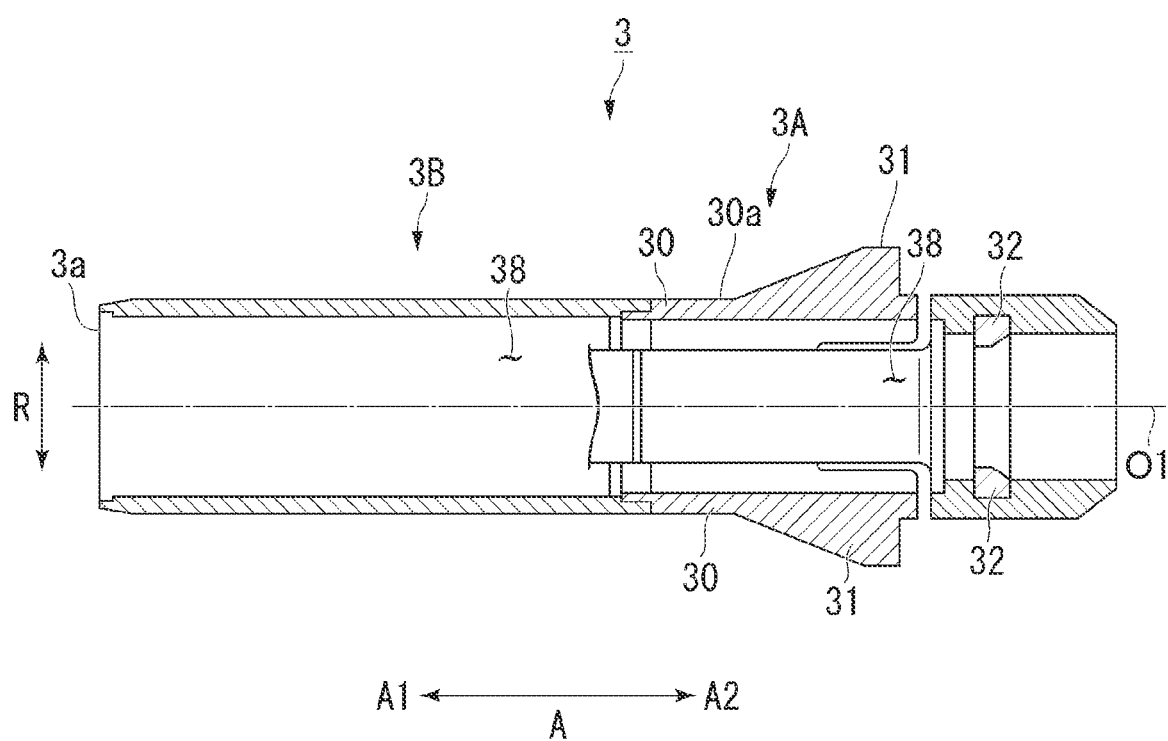
FIG. 5 is a cross-sectional view of an example in the longitudinal direction of the same holding member of the clip apparatus.

FIG. 5 is a cross-sectional view in the longitudinal direction A of the holding member 3.

The holding member 3 is a circular tubular member capable of storing at least a part of the clip 2. The holding member 3 has an internal space 38 in which the clip 2 moves forward and backward in the longitudinal direction A. The holding member 3 can fix the clip 2 retracted into the internal space 38 in a closed state.

Holding member 3 includes a holding cylinder 3A provided on the proximal end side A2, and a holding cylinder 3B provided on the distal end side A1.

Retaining cylinder (second tubular member) 3A has a pressing cylinder body 30 formed in a cylindrical shape, a projecting wing 31, and a clamping member 32.

The holding cylinder body 30 can be formed by injection molding a thermoplastic resin having a material softer than that of the clip 2, for example, PPA (polyphthalamide), PA (polyamide). PEEK (polyether ether ketone), LCP (liquid crystal polymer), or the like, with appropriate elasticity. Note that the holding tube body 30 may be formed of a metal rather than a thermoplastic resin.

Projecting wing 31 can include a pair of convex portions projecting against the outer peripheral surface 30a of the pressing cylinder body 30. The projecting wing 31 is provided on both sides across the central axis O1. Projecting wing 31, the protruding state protruding outward in the radial direction R with respect to the outer peripheral surface 30a and the basic posture. Projecting wing 31, by receiving a force toward the inside from the outside of the radial direction R, the retraction state of retraction with respect to the outer peripheral surface 30a. When the above-mentioned force is released, the projecting and retracting wings 31 return from the retracted state to the protruding state.

Tightening member 32 is a ring-shaped member provided in the inner space 38 of the pressing cylinder 3A. Tightening member 32 is formed of metal. The tightening member 32 may be formed such as to be harder than the pressing tube main body 30, and may be formed of, for example, a thermoplastic resin instead of a metal.

The central axis of the tightening member 32 is disposed such as to coincide with the central axis O1. Tightening member 32 is disposed on the proximal end side A2 than the projecting wing 31. For example, tightening member 32 is incorporated in the pressing cylinder body 30 by insert molding. Tightening member 32 is disposed at a position protruding inward in the radial direction R from the inner peripheral surface of the pressing cylinder body 30.

Retaining cylinder (first tubular member) 3B is a cylindrical member made of metal. The retaining cylinder 3B is press-fitted into the distal end of the retaining cylinder 3A. The retaining cylinder 3A and the retaining cylinder 3B may be connected by thermal welding, adhesive, or screwing.

Figure 6:
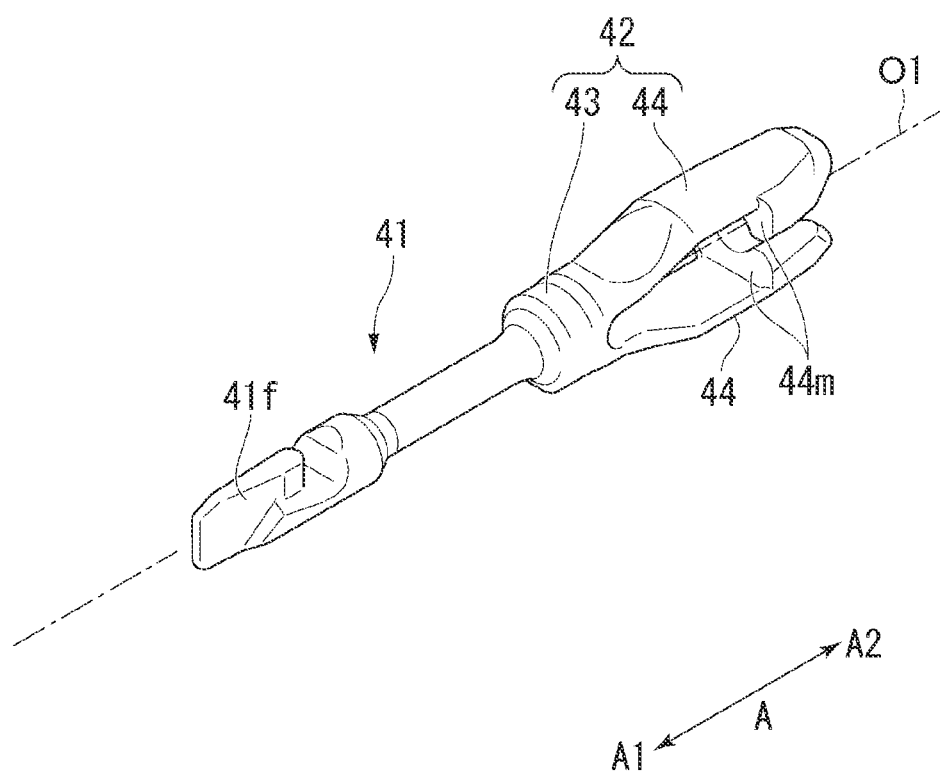
FIG. 6 is a perspective view of an example of a connector of the clip apparatus.

FIG. 6 is a perspective view of the connector 4.

The connector 4 is detachably coupled to the proximal end 28 of the clip 2. The connector 4 is detachably connected to a conical retainer 231 inserted through the sheath 220. The connector 4 connects the clip 2 and the conical retainer 231. Connector 4 includes an insertion portion 41 to be inserted into the inner space 38 of the holding member 3, and a connecting portion 42 provided at the base end of the insertion portion 41.

Insertion portion 41 has a hook 41f at the distal end. Hook 41f is a hook extending in a direction perpendicular to the central axis O1 and can be formed in a substantially cylindrical rod shape. The proximal end 28 of the clip 2 is hooked on the hook 41f. The hook 41f releases when the proximal end 28 is pulled proximally to exert a specified (e.g., predetermined) release force.

The connecting portion 42 is an engaging portion in which the conical retainer 231 of the clip introducing device 200 is engaged. Connecting portion 42 includes a connecting portion body 43, and an elastic arm portion 44.

The elastic arm portion 44 is provided at the proximal end of the connecting portion main body 43, and branches into a bifurcated shape. The elastic arm portion 44 is elastically deformable with respect to the connecting portion body 43 the elastic arm portion 44 can be opened and closed with respect to the connecting portion body 43. The elastic arm portion 44 is formed with a notched portion 44m for holding and accommodating the engaging portion 231a of the conical retainer 231. The notched portion 44m is formed in a shape that closely contacts the outer peripheral surface of the engaging portion 231a of the conical retainer 231.

[Operation of Clip Delivery Device 300]

Next, the operation and operation of the clip delivery device 300 will be described with reference to FIGS. 7 to 13.

Figure 7:
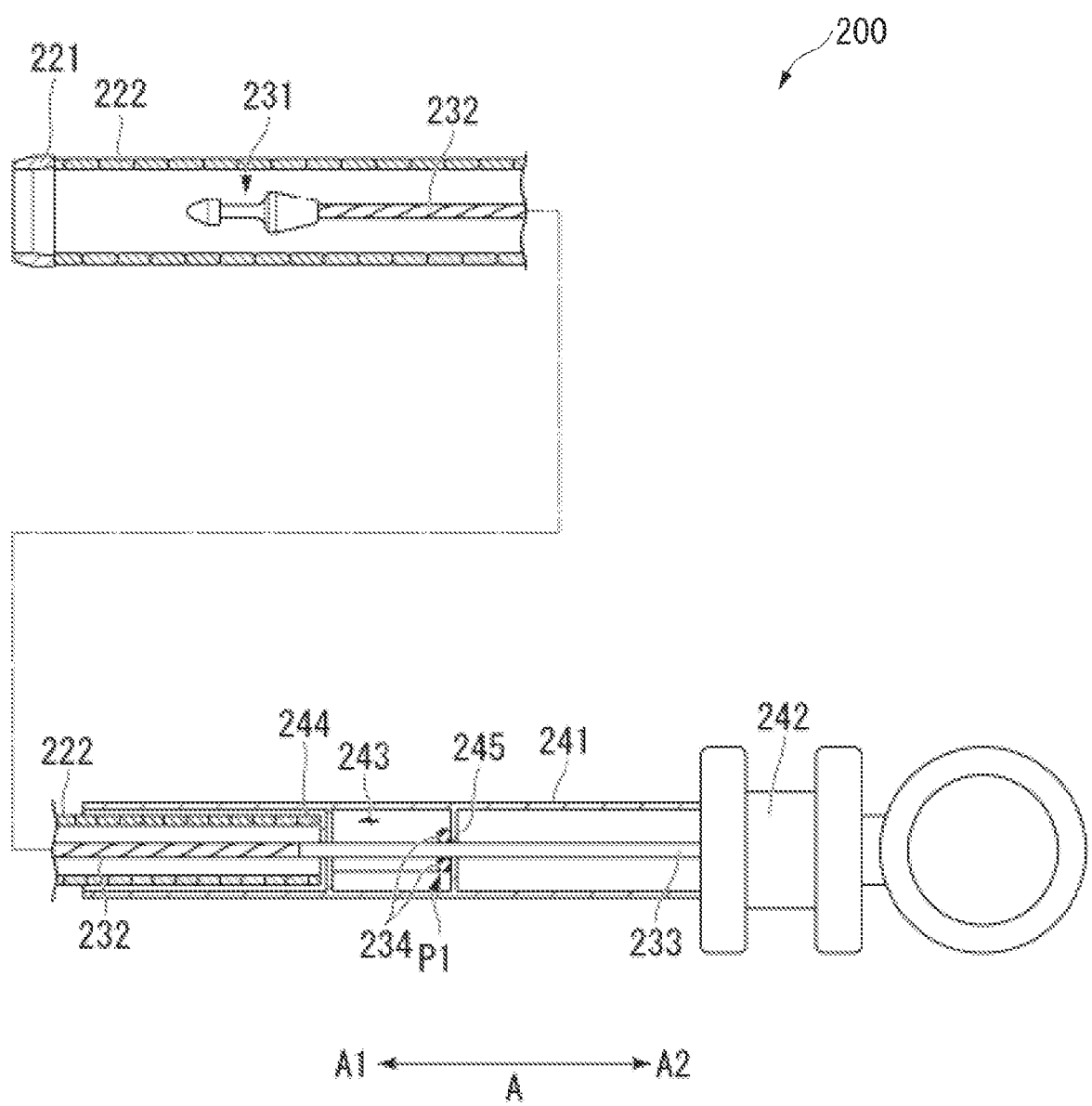
FIG. 7 is a cross-sectional view of an example showing the same clip introduction device before loading.

FIG. 7 is a cross-sectional view showing the clip introducing apparatus 200 before the clip apparatus 1 is loaded. Before loading the clip apparatus 1, the slider 242 can be disposed on the most proximal side A2, and the conical retainer 231 is disposed inside the sheath 220. O-ring 234 can be disposed at a first position P1 in contact with the second locking portion 245 in the inner space 243.

Figure 8:
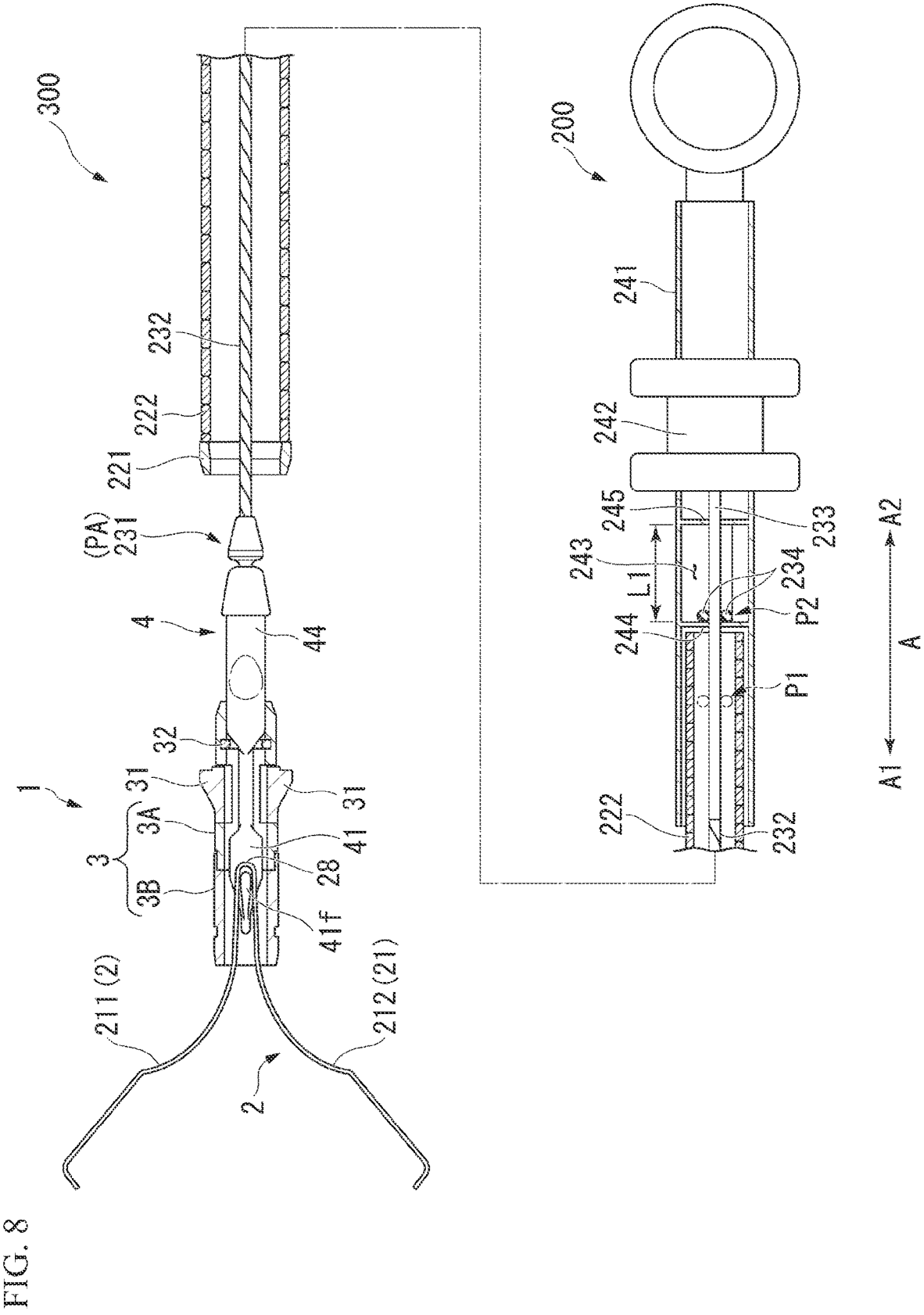
FIG. 8 is a cross-sectional view of an example showing the same clip delivery device in which the clip apparatus is loaded.

FIG. 8 is a cross-sectional view showing the clip delivery device 300 loaded with the clip apparatus 1. To load the clip apparatus 1 into the conical retainer 231 of the clip introduction device 200, the user advances the slider 242 to advance the conical retainer 231 from the sheath 220 to the distal end side A1 to the clip loading position PA.

Length conical retainer 231 moves from the inside of the sheath 220 to the clip loading position PA is longer than the length L1 from the first locking portion 244 to the second locking portion 245. Therefore, as the cylinder 233 is advanced, the O-ring 234 slides to the second position P2 of the proximal end side A2 from the first position P1 is engaged with the first locking portion 244. When projecting the conical retainer 231 from the sheath 220 to the distal end side A1 and sliding the O-ring 234 from the first position P1 to the second position P2, it is necessary to advance the slider 242 with a force amount equal to or greater than the first force amount per unit length.

Figure 9:
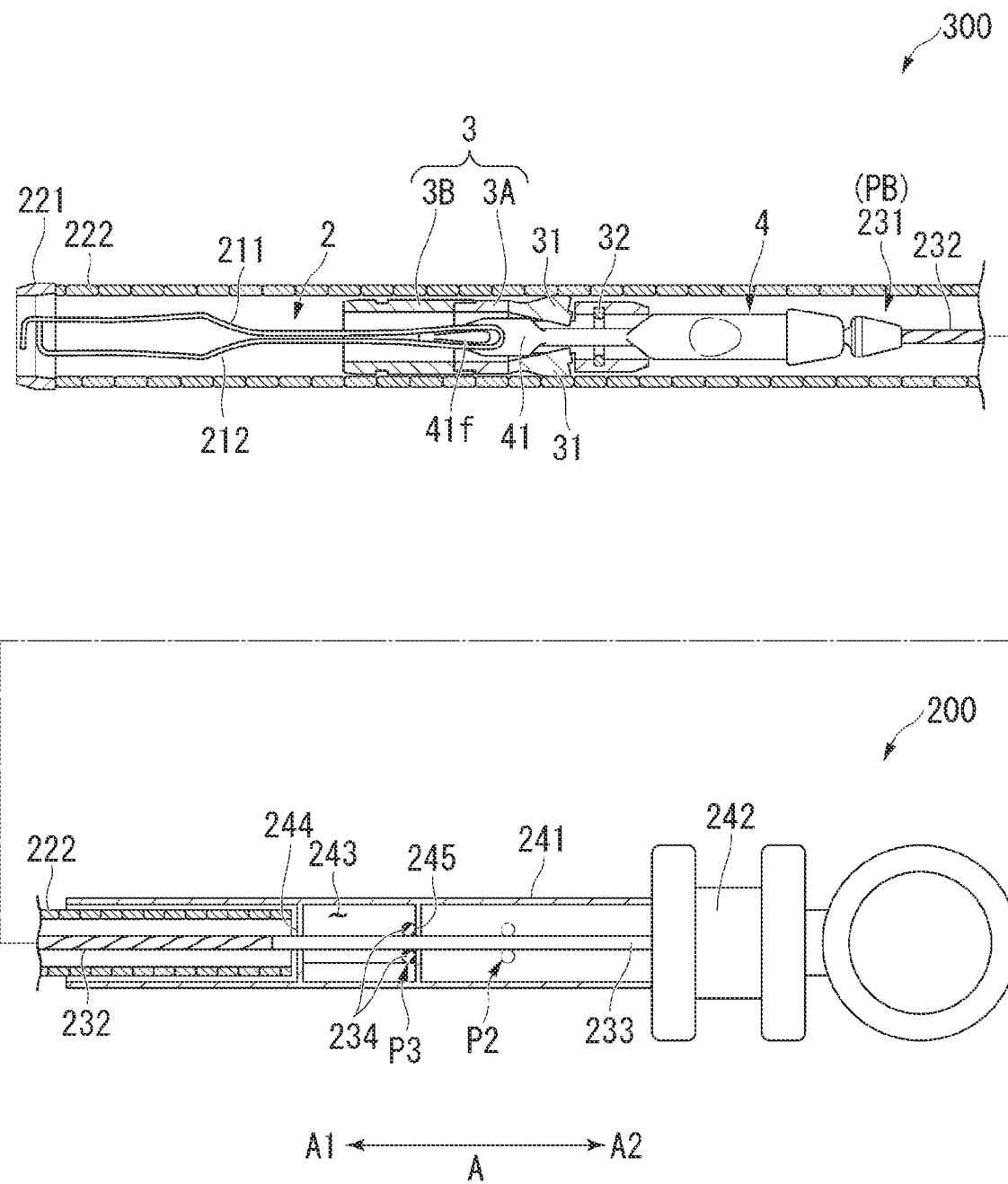
FIG. 9 is a cross-sectional view of an example showing the same clip delivery device accommodated in the sheath.

FIG. 9 is a cross-sectional view showing a clip delivery device 300 in which the clip apparatus 1 is accommodated in the sheath 220. In order to accommodate the loaded clip apparatus 1 in the sheath 220, the user moves the slider 242 backward and moves the conical retainer 231 backward to the clip accommodating position PB. The clip apparatus 1 is accommodated in the sheath 220 by bringing the projecting and retracting wings 31 into the retracted state.

Length conical retainer 231 moves from the clip loading position PA to the clip accommodating position PB is longer than the length L1 from the first locking portion 244 to the second locking portion 245. Therefore, as the cylinder 233 moves backward, the O-ring 234 slides to the third position P3 of the distal end side A1 from the second position P2 is engaged with the second locking portion 245. When the sheath 220 houses the conical retainer 231, and when sliding the O-ring 234 from the second position P2 to the third position P3, it is necessary to reverse the slider 242 with a force amount equal to or larger than the first force amount per unit length.

The clip introducing device 200 loaded clip apparatus 1 is introduced into the body through the channel C of the endoscope.

Figure 10:
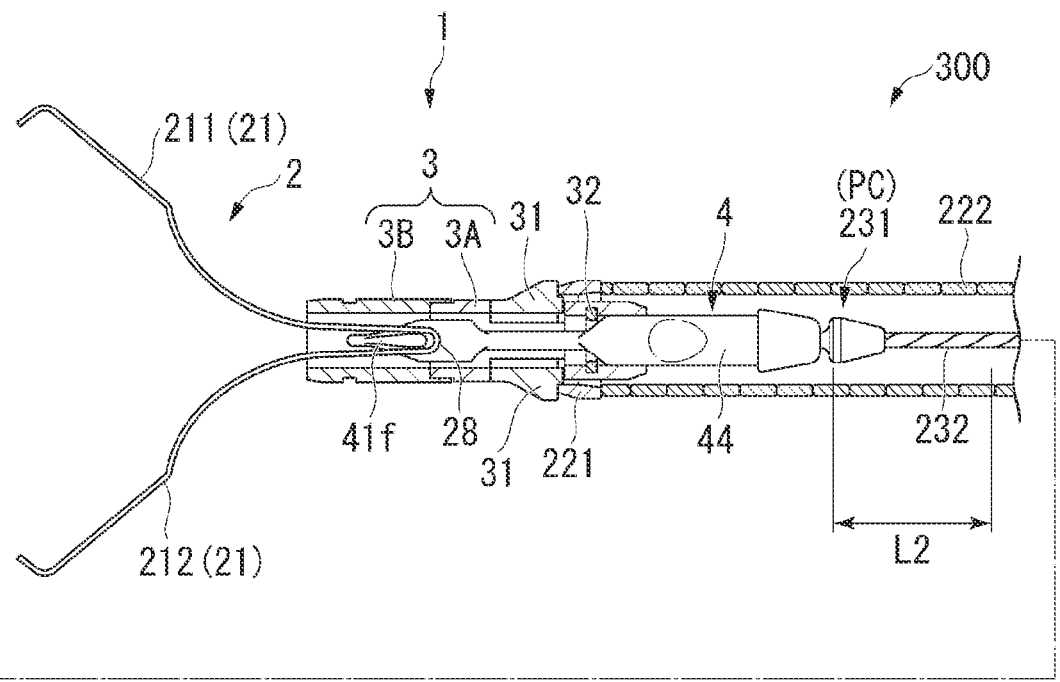
FIG. 10 is a cross-sectional view of an example showing a clip delivery device protruding from the sheath.
Figure 10:
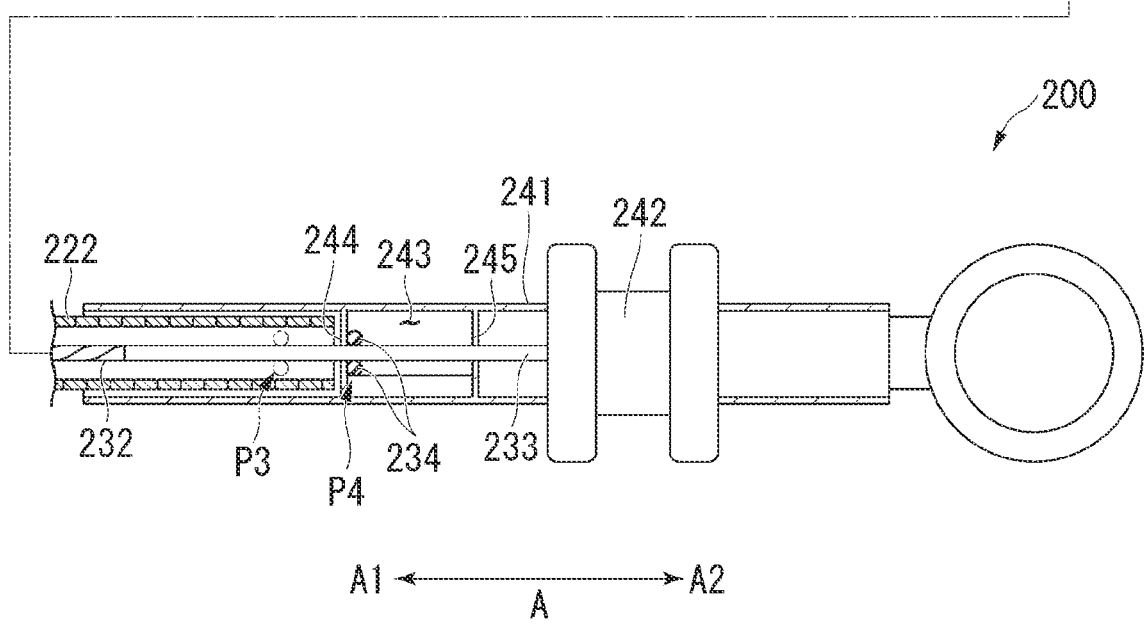

FIG. 10 is a cross-sectional view showing the clip delivery device 300 in which the clip apparatus 1 protrudes from the sheath 220. The conical retainer 231 is advanced to the clip protrusion position PC by advancing of slider 242 in order to make the clip 2 and the like protrude from the sheath 220 and open the clip 2 to be ready for use. The clip apparatus 1 is advanced until the protruding and retracting wings 31 exit the sheath 220. The projecting and retracting wings 31 return from the retracted state to the projecting state by the distal end side exiting from the sheath 220.

Length that conical retainer 231 moves from the clip receiving position PB to the clip protruding position PC is longer than the length L1 from the first locking portion 244 to the second locking portion 245. Therefore, the O-ring 234 slides to the fourth position P4 of the proximal end side A2 from the third position P3 is engaged with the first locking portion 244 as the cylinder 233 is advanced. In the case of projecting the clip apparatus 1 from the sheath 220, when sliding the O-ring 234 from the third position P3 to the fourth position P4, it is necessary to advance the slider 242 with a force amount equal to or larger than the first force amount per unit length. The handle 248 is configured to change a configuration of the clip from the first configuration to a third configuration. The obstruction 234 is configured to generate the sliding resistance from the first configuration (FIG. 10) to the third configuration (FIG. 8), and the first end of the wire 232 in the third configuration is placed further than the first end of the wire 232 in the first configuration relative to the obstruction 234 while the obstruction 234 contacts the first wall 244. The handle 248 is configured to change a configuration of the clip 2 from the third configuration (FIG. 9) to the first configuration (FIG. 10). The obstruction 234 is configured to generate the sliding resistance from the third configuration (FIG. 9) to the first configuration (FIG. 10). The first end of the wire 232 in the first configuration (FIG. 10) is placed further than the first end of the wire 232 in the third configuration (FIG. 9) relative to the obstruction 234 while the obstruction 234 contacts the first wall 244.

Figure 11:
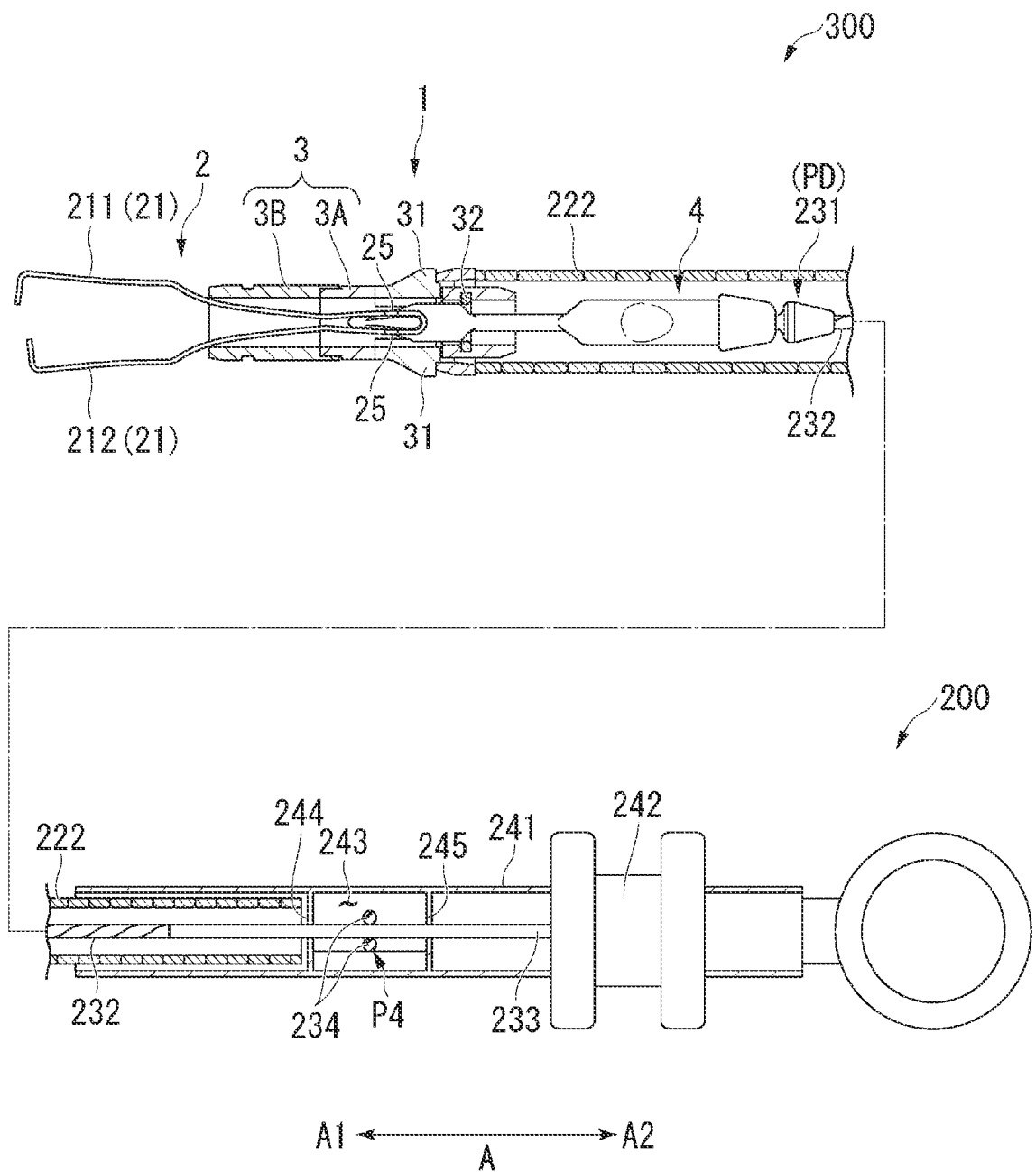
FIG. 11 is a cross-sectional view of an example showing the same clip delivery device towed.

FIG. 11 is a cross-sectional view showing the clip delivery device 300 with the clip 2 pulled. By retracting the slider 242 to retract the conical retainer 231 to the re-grippable position PD. The re-grippable position PD can be a position between the clip protrusion position PC and the clip lock position PE described below. FIG. 11 shows an example of the conical retainer 231 in the re-grippable position PD. The connector 4 connected to the conical retainer 231 pulls the clip 2. A pair of arms 21 pushes the distal end opening 3a of the holding member 3 to the proximal end side A2 by being towed to the proximal end side A2. The projecting and retracting wings 31 in the projecting state are engaged with the sheath 220, so that the wings are not pulled into the sheath 220. Therefore, the clip 2 pulled by the connector 4 is pulled into the holding member 3. The handle 248 is configured to change a configuration of the clip from a third configuration (FIG. 9) to the second configuration (FIG. 11). The obstruction 234 is configured to generate the sliding resistance from the second configuration (FIG. 11) to the third configuration (FIG. 9). The first end of the wire 232 in the second configuration (FIG. 11) is placed further than the first end of the wire 232 in the third configuration (FIG. 9) relative to the obstruction 234 while the obstruction 234 is spaced apart from the first wall 244. In the second configuration, the obstruction 234 is spaced apart from the second wall 245 or contacts the second wall 245.

When the proximal end portion 28 of the clip 2 is towed to the proximal end side A2 of the holding member 3 via the connector 4, a pair of arms 21 are pulled to the holding member 3, and the pair of arms 21 is gradually closed. For example, when in the re-grippable position PD shown in FIG. 11, the conical retainer 231 can be positioned such that the pair of arms 21 can still be urged toward holding the tissue in a substantially closed position, but not in a locked state. When the conical retainer 231 is in the re-grippable position PD, the engaging portion 25 is positioned on the distal end side A1 further than the clamping member 32, and the pair of arms 21 is not locked in the closed state and the pair of arms 21 can be reopened.

A length L2 the conical retainer 231 moves from the clip projection position PC to the re-grippable position PD is shorter than or substantially same as a length L1 in a longitudinal axis direction from the first locking portion 244 to the second locking portion 245. Therefore, even if the cylinder 233 is backward, the O-ring 234 maintain the fourth position P4 without being moved by the second locking portion 245. As a result, the user can move the slider 242 backward with a second force that is smaller than the first force.

When the pulling force of the slider 242 is released in the state the conical retainer 231 is in the grippable position PD, the clip 2 moves to the distal side A1 by the self-expanding force of the pair of arms 21 and returns to the open state shown in FIG. 10. The clip 2 may be returned to the open state by advancing the slider 242 based on the operation of the user. The O-ring 234 does not move from the fourth position P4. The user can return the pair of arms 21 to the open state to re-grip the biological tissue.

Figure 12:
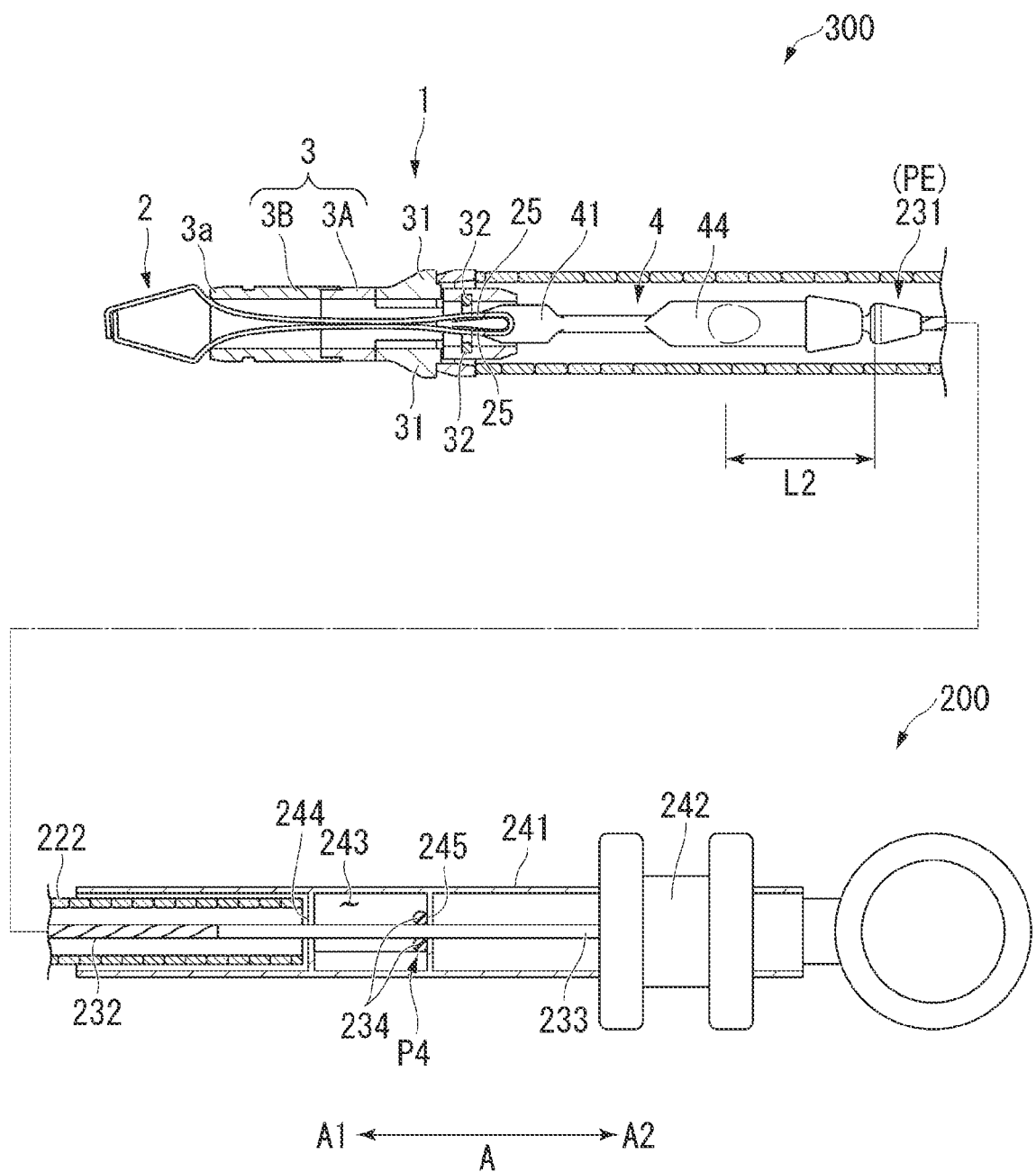
FIG. 12 is a cross-sectional view of an example showing the same clip delivery device further towed.

FIG. 12 is a cross-sectional view showing the clip delivery device 300 with the clip 2 further pulled. The user retracts the slider 242 to retract the conical retainer 231 to the clip lock position PE. The proximal end portion 28 is further towed to the proximal end side A2 of the holding member 3, and the engaging portion 25 is retracted to the proximal end side A2 from the clamping member 32. When the engaging portion 25 is retracted from the clamping member 32 to the proximal end side A2, the engaging portion 25 and the clamping member 32 is engaged. As a result, the clip 2 is restrained from moving toward the distal end side A1 with respect to the holding member 3, and the pair of arms 21 are locked in the closed state. When the pair of arms 21 is locked in the closed state, the pair of arms 21 are inhibited from returning to the open state.

A length L2 that the conical retainer 231 moves from the clip projection position PC to the clip locking position PE (see FIGS. 10 and 12) is substantially the same as the length L1 from the first locking portion 244 to the second locking portion 245.

Figure 13:
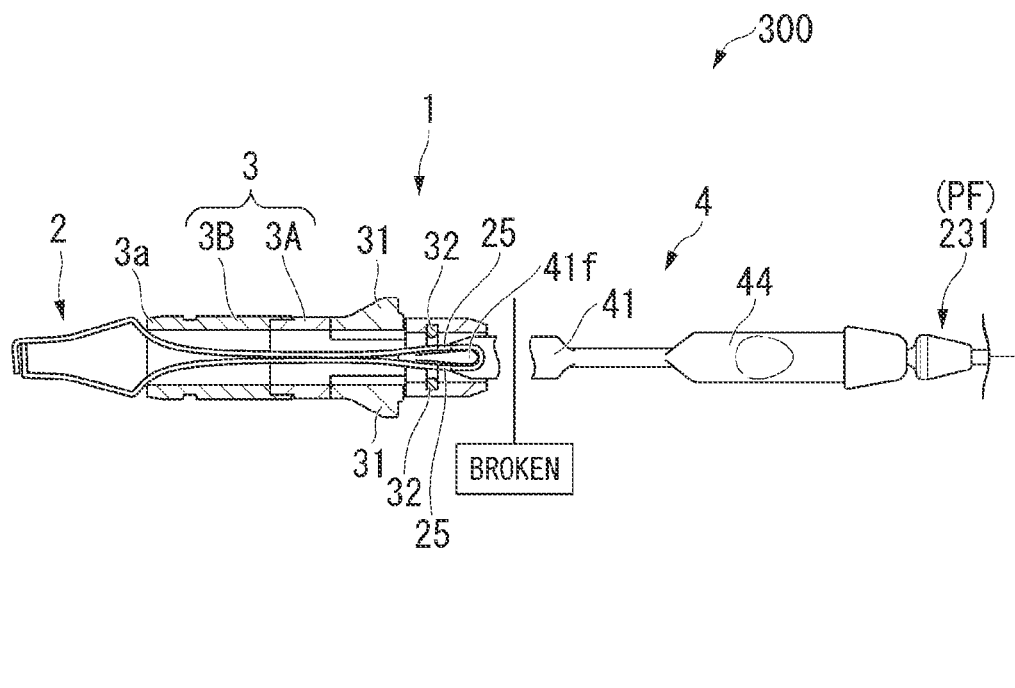
FIG. 13 is a cross-sectional view of an example showing the same clip delivery device connector of the clip apparatus is released.
Figure 13:
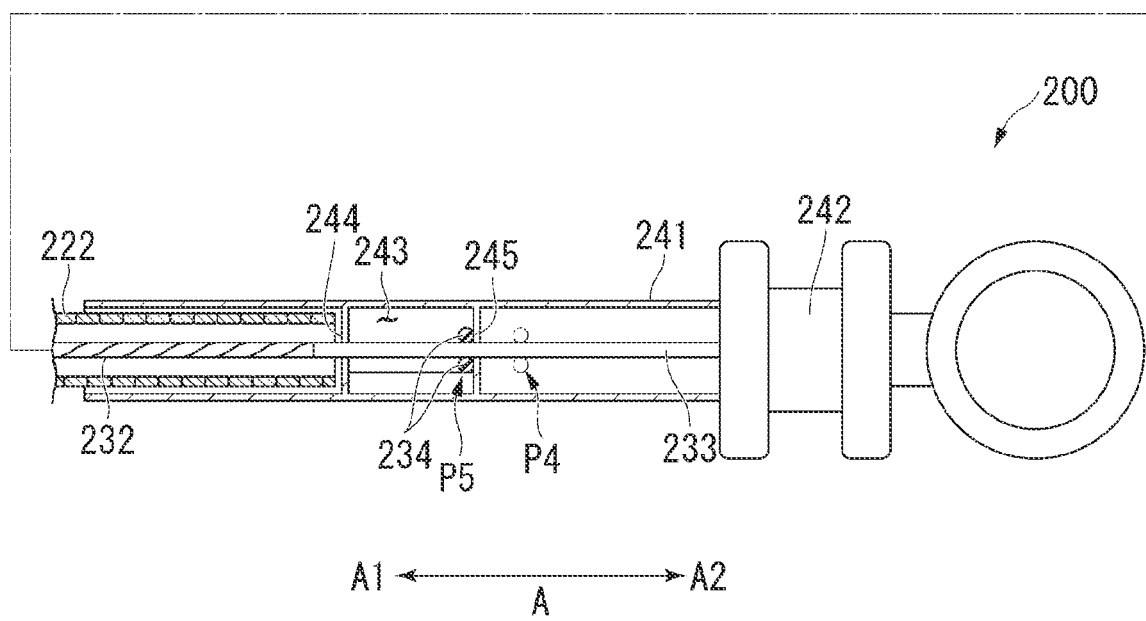

FIG. 13 is a cross-sectional view showing the clip delivery device 300 in which the connector 4 of the clip apparatus 1 is released. The user retracts the slider 242 to retract the conical retainer 231 to the clip retention position PF. The hook 41f is released when a predetermined amount of release force is applied to the hook 41f of the connector 4. The connecting member 4 may be used to uncouple the clip 2 from the conical retainer 231 by deforming the hook 41f. The user retracts the sheath 220 and places the clip 2, which is in a ligated state of the biological tissue, in the body.

As the cylinder 233 moves backward, the O-ring 234 is engaged with the second locking portion 245 and the O-ring 234 slides from the fourth position P4 to the fifth position P5 of the distal end side A1. When the user releases the hook 41f and slides the O-ring 234 from the fourth position P4 to the fifth position P5, it is necessary for the user to move the slider 242 backward with a force equal to or more than the first force per unit length. At this time, the first amount of force to slide the O-ring 234 is sufficiently smaller than the amount of force to uncouple the clip 2 from the conical retainer 231, so the surgeon can uncouple the clip 2 from the conical retainer 231 without encountering excessive resistance during operation (e.g., sliding resistance). The handle is configured to change a configuration of the clip from the second configuration to a fourth configuration. The obstruction is configured to generate the sliding resistance from the second configuration (FIG. 11) to the fourth configuration (FIG. 13). The first end of the wire 232 in the second configuration (FIG. 11) is placed further than the first end of the wire 232 in the fourth configuration (FIG. 13) relative to the obstruction 234 while the obstruction 234 is spaced apart from the first wall 244. In the second configuration, the obstruction 234 is spaced apart from the second wall 245 or contacts the second wall 245.

According to the embodiment of the clip delivery device 300 and the clip introducing device 200, when the conical retainer 231 moves in the specified range between the clip protrusion position PC of the open state of the clip 2 and re-grippable position PD of the closed state of the conical retainer 231, the slider 242 can be advanced and retracted with a second force that is smaller than the first force. And it is easy to perform the operation to re-grip the biological tissue since the user can feel the open state or the closed state (e.g., ready to be re-grippable) from the sensation of operating the slider 242.

When the conical retainer 231 moves from the clip protrusion position PC to the clip loading position PA, the user needs to advance the slider 242 with a force equal to or more than the first force per unit length. When performing a tissue regripping operation, especially when moving the conical retainer 231 from the re-grippable position PD to the clip protrusion position PC, the user only needs to move the slider forward with a second force amount that is smaller than the first force amount. Therefore, unintentional contact of the wire from the obstacle by unintentionally moving the conical retainer 231 to the clip loading position PA is prevented, when performing the biological tissue gripping operation.

When the length L1 and L2 are equal and when the distance the conical retainer 231 moves from the re-grippable position PD to the clip lock position PE, the user would need to backward the slider 242 with a force equal to or more than the first force per unit length. Accordingly, the system described herein can prevent the clip 2 from being erroneously locked by unintentionally moving the conical retainer 231 to the clip placement position PF when performing the biological tissue gripping operation.

(Modification 1)

In the above embodiment, the operation wire (force transmitter member) 230 includes a wire (first force transmitter member) 232, a cylinder attached to the proximal end portion of the wire 232 (second force transmitter member, second wire) 233, the operation wire (force transmitter member) 230 aspects are not limited thereto. Operation wire (force transmitter member) 230 may include a first wire disposed on the distal end side A1 (first force transmitter member), a second wire having higher stiffness than the first wire disposed on the proximal end side A2 (second force transmitter member). The O-ring 234 is slidably mounted along the longitudinal direction A on the outer peripheral portion of the second wire (second force transmitter member). That is, of the operation wire (force transmitter member) 230, the second force transmitter member for inserting the inner space 243, higher stiffness than the other portions, it is desirable that hardly bended. The wire includes the first wire 232 and the second wire 233. The first wire 232 includes the first end and a third end, and the second wire 233 includes the second end and a fourth end attached to the third end. The second wire 233 has higher rigidity than the first wire 232, and the second wire 233 is attached to the obstruction 234. The second wire can be a cylinder. The obstruction 234 can be a ring shape and attached on a periphery of one of the first wire 232 or the second wire 233.

(Modification 2)

Figure 14:
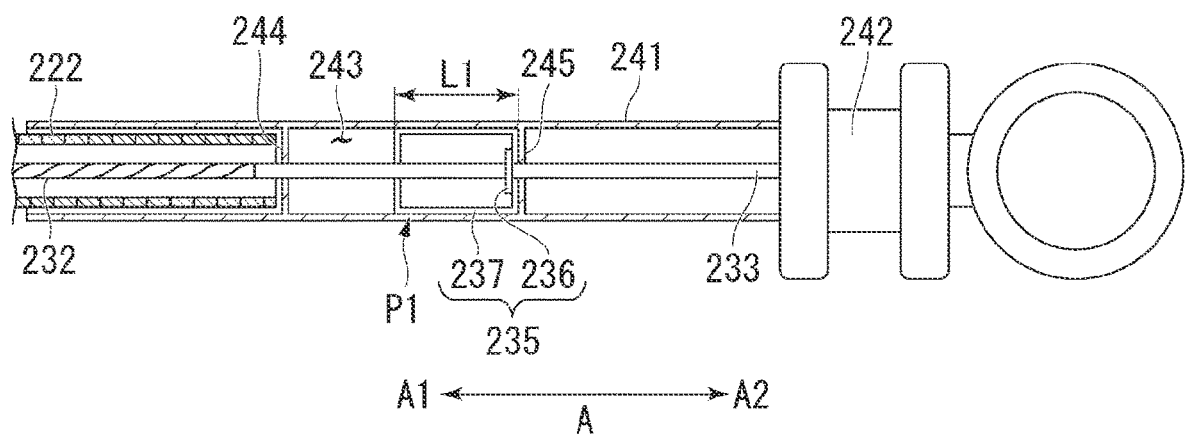
FIG. 14 is a cross-sectional view of an example showing the clip introduction device before loading according to modification of the embodiment.
Figure 15:
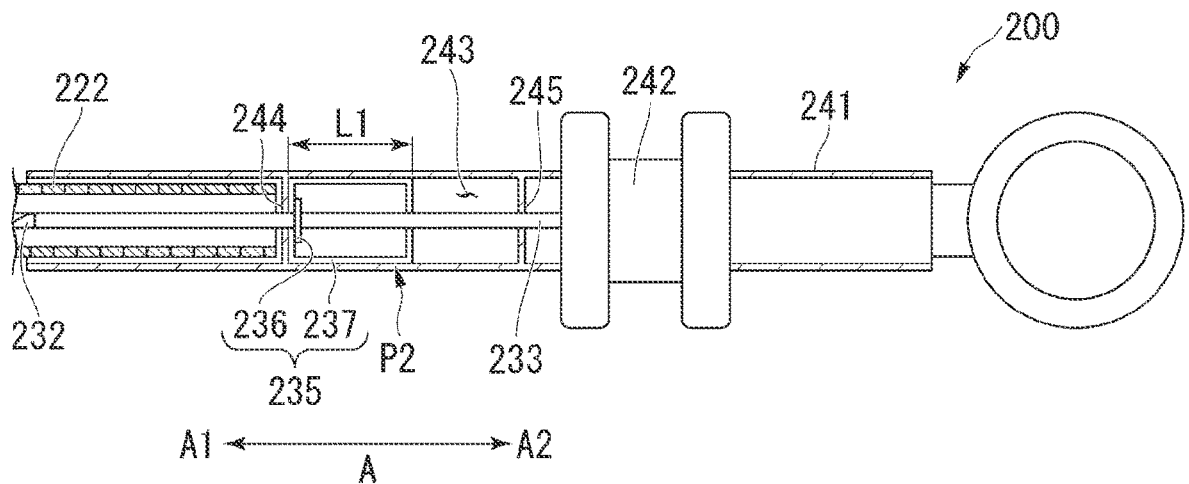
FIG. 15 is a cross-sectional view of an example showing the clip introduction device before loading according to modification of the embodiment.
Figure 16:
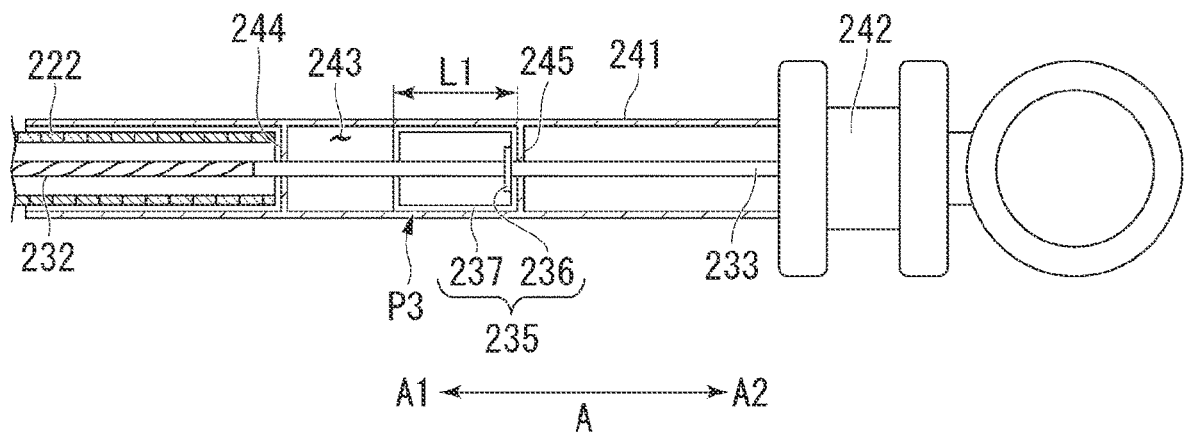
FIG. 16 is a cross-sectional view of an example showing the clip introduction device before loading according to modification of the embodiment.
Figure 17:
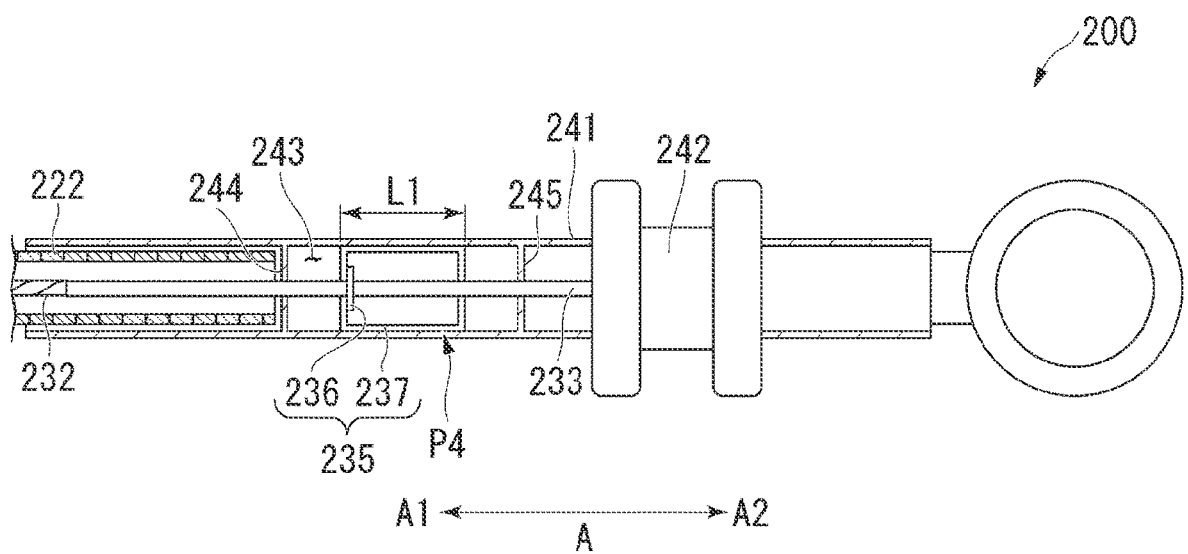
FIG. 17 is a cross-sectional view of an example showing the clip introduction device before loading according to modification of the embodiment.
Figure 18:
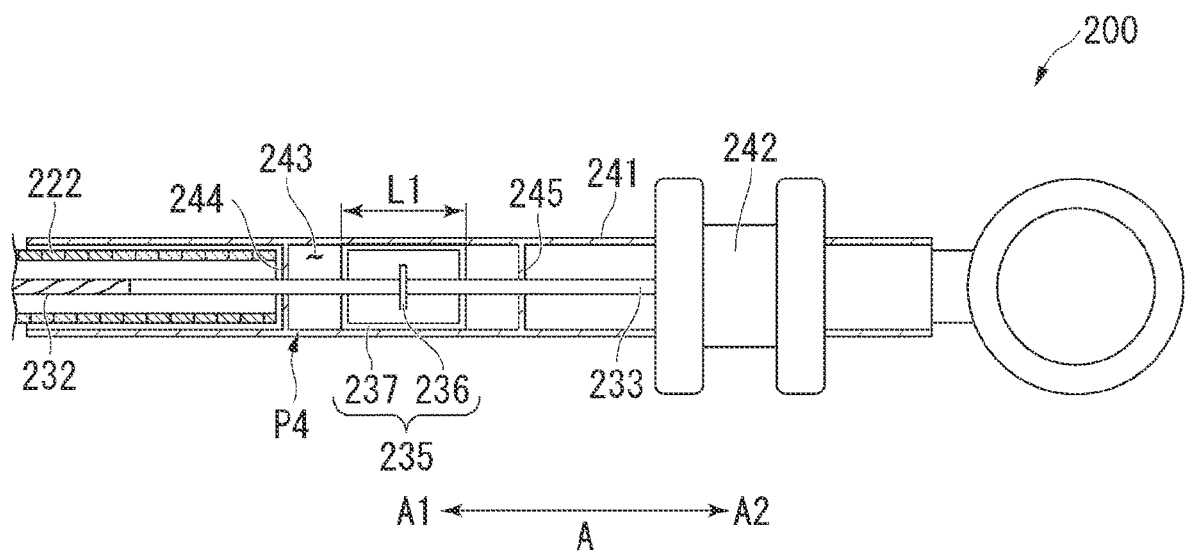
FIG. 18 is a cross-sectional view of an example showing the clip introduction device before loading according to modification of the embodiment.
Figure 19:
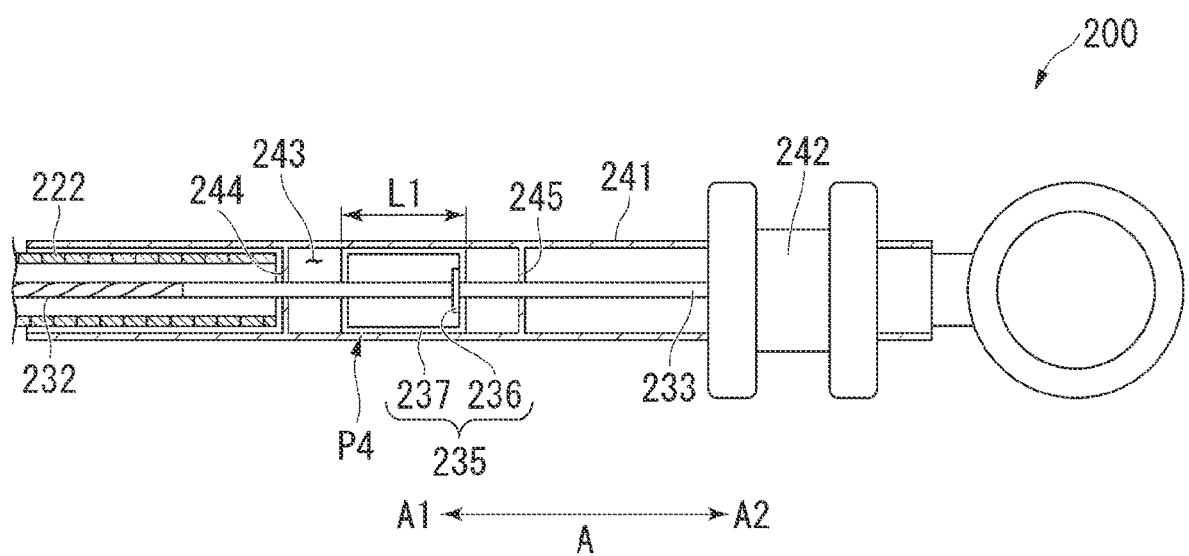
FIG. 19 is a cross-sectional view of an example showing the clip introduction device before loading according to modification of the embodiment.
Figure 20:
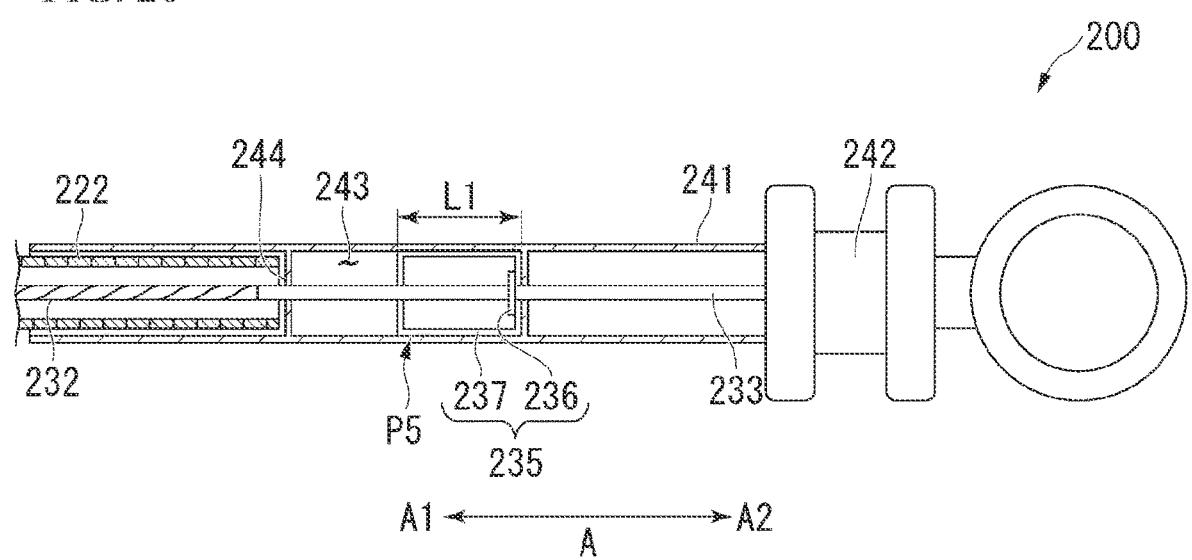
FIG. 20 is a cross-sectional view of an example showing the clip introduction device before loading according to modification of the embodiment.

The obstruction 234 is not limited to an O-ring structure. FIG. 14 to 20 show a cross-sectional view of the clip introduction device before loading according to modification of the embodiment. FIG. 14 corresponds FIG. 7 in the above embodiment. FIG. 15 corresponds FIG. 8 in the above embodiment. FIG. 16 corresponds FIG. 9 in the above embodiment. FIG. 17 corresponds FIG. 10 in the above embodiment. FIG. 18 corresponds FIG. 11 in the above embodiment. FIG. 19 corresponds FIG. 12 in the above embodiment. FIG. 20 corresponds FIG. 13 in the above embodiment.

The sliding member 235 has a projection fixed to the cylinder 236 fixed to the cylinder 233, and a sliding cylinder 237 housed in the inner space 243. The sliding cylinder 237 is in contact with the inner wall of the inner space 243. Here, an amount of force per unit length required to slide the sliding cylinder 237 along the inner wall of the inner space 243 in the longitudinal direction A is defined as a "first amount of force.

The cylinder 233 penetrates the sliding cylinder 237 in the longitudinal direction A. and the projection 2 The projection 236 is located inside the sliding tube 237. The projection 236 cannot pass through the sliding cylinder 237. The protrusion 236, by contacting with the sliding cylinder 237, can cause the protrusion 236 to advance or retract the sliding cylinder 237 along the longitudinal direction A.

As shown in FIG. 14, before loading the clip apparatus 1, the sliding member 235 is positioned at the first position P1 in contact with the second engagement portion 245 in the internal space 243.

As shown in FIG. 15, when the sliding cylinder 237 slides from the first position P1 to the second position P2 to load the clip apparatus 1, the user would need to exert an amount of force on the slider 242 $f$ greater than the first force amount per unit length.

As shown in FIG. 16, when the sliding cylinder 237 slides from the second position P2 to the third position P3 to accommodate the clip apparatus 1 in the sheath 220, the user would need to exert a force to retract the slider 242 greater than the first force amount per unit length.

As shown in FIG. 17, when the sliding cylinder 237 slides from the third position P3 to the fourth position P4 to protrude the clip 2, etc. from the sheath 220, a user would need to exert a force to advance the slider 242 greater than the first force amount per unit length.

As shown in FIGS. 18 and 19, when closing the clip 2 and keeping the clip 2 re-grippable, the slider 242 can be retracted with a second force amount that is lesser than the first force amount.

As shown in FIG. 20, when the sliding member 235 slides from the fourth position P4 to the fifth position P5 to release the hook 41$f$, a user would need to exert a force to retract the slider 242 greater than the first force amount per unit length.

The method of using a treatment tool, the method comprises moving the wire 232 and the first clip 2 attached to the wire 232 distally in the sheath 220, protruding the first clip 2 from the sheath 220, opening the pair of arms 21 of the first clip 2 while the obstruction 234 contacts the first wall 244 of the operation body 240, the obstruction 234 attached to the wire 232 or 233. The obstruction 234 and the wire 232 are placed in a relative position; and the method comprises closing the pair of arms 21 while the obstruction 234 is spaced apart from the first wall 244. In the closing, the obstruction 234 is spaced apart from the second wall 245 or contacts the second wall 245 of the operation body 240. The obstruction 234 and the wire 232 are maintained in the relative position.

The method can comprise inserting the second clip 3 into the sheath 220, moving the wire 232 or 233 proximally relative to the obstruction 234 while adding a force to the wire 232 or 233 to overcome a sliding resistance between the obstruction 234 and the wire 232 or 233. The method can comprises removing the first clip 2 from the wire 232 or 233, moving the wire 232 or 233 distally relative to the obstruction 234, attaching a second clip 2 to the wire 232 or 233, and the obstruction 234 generates a sliding resistance while the obstruction 234 contacts the first wall 244. The method can be comprises reopening a pair of arms 21 of the second clip 2 while the obstruction 234 contacts the first wall 244, reclosing the pair of arms of the second clip while the obstruction is spaced apart from the first wall 244. In the reclosing, the obstruction is spaced apart from the second wall 245 or contacts the second wall 245. The obstruction 234 and the wire 232 or 233 are placed in the relative position while reoperating, and the obstruction 234 and the wire 232 or 233 are maintained in the relative position while reclosing.

The method can comprise moving the wire 232 or 233 proximally relative to obstruction 234 while adding a force to the wire 232 or 233 beyond a sliding resistance between the obstruction 234 and the wire 232 or 233, removing the second clip 2 from and the wire 232 or 233 while the pair of the arms 21 reclosing. An amount of movement of the wire 232 or 233 between the opening and the closing can be substantially equal to a length between the first wall 244 and the second wall 245. Substantially equal can include design errors and the range in which the same effect can be achieved as in the present application. The length of is longer than the amount of movement. The obstruction 234 is configured to generate a sliding resistance while the obstruction 234 moves relative to the wire 232 or 233.

The detailed description herein includes references to the accompanying drawings, which form a part of the detailed description. The drawings show, by way of illustration, specific embodiments in which the present subject matter can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

DESCRIPTION OF SYMBOLS

300 Clip Delivery Devices (Clip Systems)
200 Clip introduction device (applicator)
230 Operation wire (force transmitter member)
231 Conical retainer (tip)
234 O-ring (sliding member)
240 operation unit (handles)
243 Internal space (sliding space)
244 First locking part
245 Second locking part
1 Clip apparatus (Treatment Instrument for Endoscope)
2 Clip
21 Pair of arms
25 Engaging portion
28 Proximal portion
3 Retaining member (tubular member)
3A holding cylinder
30 Holding cylinder body
31 Sunk wing
32 Clamping member
38 Internal space
3B retainer
4 Connector
PA clip loading position
PB clip receiving position
PC Clip Protrusion Position
Position where the PD can be gripped again
PE clip lock position
PF clip placement position Example 1. A clip system, comprising:
a sheath;
a force transmitter member inserted into the sheath;
an operation portion configured to advance and retract a proximal end portion of the force transmitter member along a longitudinal direction;
a sliding member slidably mounted on the proximal end portion of the force transmitter member; and
a clip including a plurality of arms that are openable and closable, the clip separably connected to a distal end portion of the force transmitter member,
wherein the operation portion includes a first locking portion at a distal end side of the sliding member along the longitudinal direction, the first locking portion configured to permit the force transmitter member to pass therethrough and to prevent or inhibit the sliding member from passing therethrough.

Example 2. The clip system according to Example 1, wherein in response to advancement of the distal end portion of the force transmitter member to a clip loading position for connecting the clip, the sliding member is configured to slide to a proximal end side in contact with the first locking portion.

Example 3. The clip system according to Example 1, wherein the operation portion comprises a second locking portion at a proximal end side of the sliding member along the longitudinal direction, the second locking portion configured to permit the force transmitter member to pass therethrough and to prevent or inhibit the sliding member from passing therethrough.

Example 4. The clip system according to Example 3, wherein when the clip loaded in the distal end portion of the force transmitter member is accommodated in the sheath, the sliding member is configured to slide to the distal end side in contact with the second locking portion.

Example 5. The clip system according to Example 4, wherein when the clip accommodated in the sheath is extended to protrude from the sheath to enter an open configuration, the sliding member is configured to slide to the proximal end side in contact with the first locking portion.

Example 6. The clip system according to Example 5, wherein the sliding member is configured to maintain a static position when the clip in the open configuration is transitioned into a closed configuration capable of re-gripping.

Example 7. The clip system according to Example 6, wherein when the clip in the closed configuration is separated from the force transmitter member, the sliding member is configured to slide toward the distal end side in contact with the second locking portion.

Example 8. The clip system according to of Example 1, further comprising a connecting member configured to be separably connected the distal end portion of the force transmitter member and the clip.

Example 9. The clip system of any according to any of Example 1,
wherein the force transmitter member includes a first force transmitter member provided on a distal end side, and a second force transmitter member provided on a proximal end side;
wherein the second force transmitter member has a higher rigidity than a rigidity of the first force transmitter member; and
wherein the sliding member is slidably mounted on the second force transmitter member.

Example 10. The clip system according to Example 9, wherein the first force transmitter is a wire; and
wherein the second force transmitter is a cylinder.

Example 11. The clip system according to Example 1, wherein the sliding member comprises a ring-shaped member attached to an outer peripheral portion of the force transmitter member.

Example 12. The clip system according to Example 1, wherein the sliding member is disposed between the first locking portion and a second locking portion.

Example 13. An applicator for introducing a clip into a body, the applicator comprising:
a sheath;
a force transmitter member including a distal end portion connecting to the clip, the force transmitter member inserted through the sheath;
an operation portion configured to advance and retract a proximal end portion of the force transmitter member along a longitudinal direction; and
a sliding member slidably mounted on the proximal end portion of the force transmitter member,
wherein the operation portion includes a first locking portion at a distal end side of the sliding member along the longitudinal direction, the first locking portion configured to permit the force transmitter member to pass therethrough and to prevent or inhibit the sliding member from passing therethrough.

Example 14. The applicator according to Example 13, wherein when the distal end portion of the force transmitter member is advanced to a clip loading position for connecting the clip, the sliding member is configured to slide to a proximal end side in contact with the first locking portion.

Example 15. The applicator according to Example 14, wherein the operation portion comprises a second locking portion provided at a proximal end side of the sliding member in the longitudinal direction and configured to permit the force transmitter member to pass therethrough and to prevent or inhibit the sliding member from passing therethrough.

Example 16. The applicator according to Example 15, wherein when the distal end portion of the force transmitter member into which the clip is loaded is retracted from the clip loading position to a clip accommodating position at which the clip is accommodated in the sheath, the sliding member is configured to slide to the distal end side in contact with the second locking portion.

Example 17. The applicator according to Example 16, wherein when the distal end portion of the force transmitter member is advanced from the clip accommodating position to a clip protruding position at which the clip is protruded to be transitioned into an open configuration, the sliding member is configured to slide to the proximal end side in contact with the first locking portion.

Example 18. The applicator according to Example 17, wherein when the distal end portion of the force transmitter member is retracted from the clip protruding position to a re-gripping position at which the clip is transitioned into a closed configuration to maintain a configuration capable of re-gripping, the sliding member is configured to maintain a static position.

Example 19. The applicator according to Example 17, wherein when the distal end portion of the force transmitter is moved from the clip protruding position to a clip placement position for separating the clip, the sliding member is configured to slide to the distal end side in contact with the second locking portion.

Example 20. The applicator according to Example 17, wherein a length of a movement of the distal end portion of the force transmitter member from the clip protruding position to a clip locking position at which the clip is transitioned into a closed configuration for locking the clip is equal to or larger than a length between the first locking portion and the second locking portion.

Example 21. The applicator according to Example 13, wherein a first force amount per a unit length to advance and retract the force transmitter member for sliding the sliding member is larger than a second force amount per a unit length to advance and retract the force transmitter member for maintaining the sliding member at a static position.

Example 22. An operation method for a clip system, wherein the clip system comprising a clip including a plurality of arms that are openable and closable; a force transmitter member including a distal end portion connected to the clip; and an operation portion for advancing and retracting a proximal end portion of the force transmitter member along a longitudinal direction,
wherein a first force amount per a unit length for moving the distal end portion of the force transmitter member to a distal end side or a proximal end side from a specified range is larger than a second force amount per a unit length for moving the distal end portion of the force transmitter member in the specified range.

Example 23. The operation method for a clip system according to Example 22, wherein when the distal end portion of the force transmitter member is in a predetermined range, the clip is in a re-grippable configuration.

Example 24. A clip system, comprising:
a sheath;
a force transmitter member for insertion into the sheath;
an operation unit for advancing and retracting a base end portion of the force transmitter member along a longitudinal direction;
a sliding member slidably mounted on the base end portion of the force transmitter member, the sliding member comprising a first locking portion;
a clip having a plurality of openable and closable arms, the clip separably connected to a tip of the force transmitter member; and
a connector a distal end portion of the force transmitter member and the clip in a detachable manner;
wherein the operation unit, when extended in the longitudinal direction toward a distal end side, permits extension of the force transmitter member and the sliding member is inhibited from extension using the first locking portion.

Example 25. The clip system according to Example 24, wherein when advancing to a clip loading position for connecting the clip at a distal end portion of the force transmitter member, the sliding member is configured to slide to a proximal end in contact with a first engaging portion.

Example 26. The clip system according to Example 24 or 25, wherein the operation unit comprises a second locking portion configured to permit the force transmitter member to pass therethrough and configured to prevent or inhibit the sliding member from passing therethrough, on a proximal end side in the longitudinal direction from the sliding member.

Example 27. The clip system according to Example 26, wherein when the clip is loaded in the distal end portion of the force transmitter member accommodated in the sheath, the sliding member is configured to slide distally in contact with the second locking portion.

Example 28. The clip system according to Example 27, wherein the sliding member is configured to slide proximally in contact with the first locking portion when the clip housed in the sheath is extended to an open configuration.

Example 29. The clip system according to Example 28, wherein the sliding member is configured to maintain position when the clip is in an open configuration and transitions to a closed configuration.

Example 30. The clip system according to Example 28, wherein the clip is configured to separate from the force transmitter member when the clip is in the closed configuration, in response to the sliding member sliding toward the tip in contact with the second engagement portion.

Example 31. The clip system according to Example 24, comprising a connecting member that separably connects the tip of the force transmitter member to the clip.

Example 32. The clip system according to Example 24, wherein the force transmitter member includes a first force transmitter member provided on a distal end side, and a second force transmitter member provided on a proximal end side:
    wherein the second force transmitter member has a higher stiffness than the first force transmitter member; and
    wherein the sliding member is slidably mounted on the second force transmitter member.

Example 33. The clip system according to Example 32, wherein the first force transmitter comprises a wire; and
    wherein the second force transmitter comprises a cylinder.

Example 34. The clip system according to Example 26, wherein the sliding member is disposed between the first locking portion and the second locking portion, Example 35. The clip system of according to Example 1, wherein the sliding member comprises a ring-shaped member attached to an outer peripheral portion of the force transmitter member.

Example 36. An applicator for introducing a clip into a body, the applicator comprising:
    a sheath;
    a tip portion configured to detachably connect to the clip;
    a force transmitter member for inserting the sheath;
    an operation unit for advancing and retracting a base end portion of the force transmitter member along a longitudinal direction;
    a sliding member slidably mounted on the base end portion of the force transmitter member;
    wherein the operation unit, when extended in the longitudinal direction toward a distal end side, permits extension of the force transmitter member and the sliding member is inhibited from extension using a first locking portion.

Example 37. The applicator according to Example 36, wherein when advancing to a clip loading position for connecting the clip at a distal end portion of the force transmitter member, the sliding member is configured to slide to a proximal end in contact with a first engaging portion.

Example 38. The applicator according to Example 36, wherein the operation unit comprises a second locking portion configured to permit the force transmitter member to pass therethrough and configured to prevent or inhibit the sliding member from passing therethrough, on a proximal end side in the longitudinal direction from the sliding member.

Example 39. The applicator according to Example 38, wherein the sliding member is configured to slide distally in contact with the second locking portion when a distal end portion of the force transmitter member loaded with the clip is transitioned from a clip loading position to a clip receiving position in which the clip is received in the sheath.

Example 40. The applicator according to Example 39, wherein the sliding member is configured to slide proximally in contact with a first engaging portion when the distal end portion of the force transmitter member is advanced from a clip accommodating position to a clip protruding position in which the clip protrudes to be opened.

Example 41. The applicator according to Example 40, wherein the sliding member is configured to maintain position when the distal end of the force transmitter member is retracted from a clip extended position to a reclaimable position in which the clip is closed and reclaimable.

Example 42. The applicator according to Example 40, wherein the sliding member is configured to slide distally in contact with the second locking portion when the distal end portion of the force transmitter member is moved from the clip protrusion position to a clip placement position in which the clip is separated.

Example 43. The applicator according to Example 39, wherein a length of movement of a distal end portion of the force transmitter member from a clip protrusion position to the clip lock position in which the clip is locked in the closed configuration is larger than a length from the first locking portion to the second locking portion.

Example 44. The applicator according to any of Example 36 through 43, wherein a first force amount per unit length for advancing and retracting the force transmitter member where the sliding member slides is greater than a second force amount per unit length for advancing and retracting the force transmitter member where the sliding member maintains position.

Example 45. A method of operating a clip system, the method comprising:
    establishing a first force amount per unit length for moving a distal end portion of a force transmitter member to a distal end side or a proximal end side outside a specified range of motion;
    establishing a lesser second force amount per unit length where the distal end portion of the force transmitter member is constrained within the specified range of motion;
    wherein the clip system comprises:
    a clip having a plurality of openable and closable arms;
    a force transmitter member having a tip portion which is connected to the clip; and
    an operation unit for advancing and retracting a base end portion of the force transmitter member along a longitudinal direction.

Example 46. The method according to Example 45, wherein the clip is established in a re-grippable configuration when a distal end portion of the force transmitter member is within the specified range of motion.

Example 47. A system, comprising:
- a sheath;
- an operation body attached to the sheath, the operation body including a first wall and a second wall;
- a clip configured to be inserted in and protruded from the sheath, the clip including a pair of arms;
- a wire inserted in the sheath, the wire including a first end and a second end, the first end attached to the clip;
- a handle attached to the second end and configured to move the wire against the operation body, the handle configured to open and close the pair of arms via the wire; and
- an obstruction attached to the wire and configured to generate a sliding resistance to the wire,
- wherein the handle is configured to change a configuration of the clip between a first configuration and a second configuration, in the first configuration, the obstruction and the wire are placed in a relative position, the handle opens the arms, and the obstruction contacts the first wall, and in the second configuration, the obstruction and the wire maintain the relative position, the handle closes the arms, and the obstruction contacts the second wall.

Example 48. The system according to Example 47,
- wherein the handle is configured to change a configuration of the clip from the first configuration to a third configuration, and
- wherein the obstruction is configured to generate the sliding resistance from the first configuration to a third configuration,
- wherein the first end of the wire in the third configuration is placed further than the first end of the wire in the first configuration relative to the obstruction while the obstruction contacts the first wall.

Example 49. The system according to any of Examples 47 or 48,
- wherein the handle is configured to change a configuration of the clip from the second configuration to a third configuration, and
- wherein the obstruction is configured to generate the sliding resistance from the second configuration to the third configuration,
- wherein the first end of the wire in the second configuration is placed further than the first end of the wire in the third configuration relative to the obstruction while the obstruction contacts the second wall.

Example 50. The system according to Example 49,
- wherein the handle is configured to change a configuration of the clip from the third configuration to the first configuration,
- wherein the obstruction is configured to generate the sliding resistance from the third configuration to the first configuration,
- wherein the first end of the wire in the first configuration is placed further than the first end of the wire in the third configuration relative to the obstruction while the obstruction contacts the first wall.

Example 51. The system according to Example 50,
- wherein the handle is configured to change a configuration of the clip from the second configuration to a fourth configuration,
- wherein the obstruction is configured to generate the sliding resistance from the second configuration to the fourth configuration,
- wherein the first end of the wire in the second configuration is placed further than the first end of the wire in the fourth configuration relative to the obstruction while the obstruction contacts the second wall.

Example 52. The system according to Example 47,
- the wire includes a first wire and a second wire,
- the first wire includes the first end and a third end, and
- the second wire includes the second end and a fourth end attached to the third end; and
- wherein the second wire has higher rigidity than the first wire, and the second wire is attached to the obstruction.

Example 53. The system according to Example 52,
- wherein the second wire is a cylinder.

Example 54. The system according to Example 47,
- wherein the obstruction is a ring shape and attached on a periphery of the wire.

Example 55. The system according to Example 7,
- wherein the first wall and second wall are located inside the operation body and spaced apart in a longitudinal axis direction of the sheath, and
- wherein the obstruction is placed at a space between the first wall and second wall.

Example 56. The system according to Example 55,
- wherein an amount of movement of the wire from the first configuration to the second configuration relative to the sheath in the longitudinal axis direction is substantially equal to a length of the space in the longitudinal axis direction.

Example 57. The system according to Example 56,
- wherein the amount of movement of the wire is shorter than the length of the space.

Example 58. A method of using a treatment tool, the method comprising:
- moving a wire and a first clip attached to the wire distally in a sheath;
- protruding the clip from the sheath;
- opening a pair of arms of the clip while an obstruction contacts a first wall of an operation portion, the obstruction attached to the wire;
- wherein the obstruction and the wire are placed in a relative position; and wherein the method comprises closing the pair of arms while the obstruction contacts a second wall of the operation body, wherein the obstruction and the wire are maintained in the relative position.

Example 59. The method according to Example 58, comprising:
- removing the first clip from the wire;
- moving the wire distally relative to the obstruction;
- attaching a second clip to the wire, wherein the obstruction generates a sliding resistance while the obstruction contacts the first wall.

Example 60. The method according to Example 59, comprising:
- inserting the second clip into the sheath;
- moving the wire proximally relative to the obstruction while adding a force to the wire to overcome a sliding resistance between the obstruction and the wire.

Example 61. The method according to Example 60, comprising:
- reopening the pair of arms of the second clip while the obstruction contacts the first wall, wherein the obstruction and the wire are placed in the relative position
- reclosing the pair of arms of the second clip while the obstruction contacts the second wall, wherein the obstruction and the wire are maintained in the relative position.

Example 62. The method according to Example 61, comprising:
moving the wire proximally relative to obstruction while adding a force to the wire beyond a sliding resistance between the obstruction and the wire; and
removing the second clip from and the wire while the pair of the arms reclosing.

Example 63. The method according to any of Examples 58 through 62,
wherein an amount of movement of the wire between the opening and the closing is substantially equal to a length between the first wall and the second wall.

Example 64. The use of treatment tool method according to Example 63,
wherein the length of is longer than the amount of movement.

Example 65. The method according to Example 58,
wherein the obstruction is configured to generate the sliding resistance while the obstruction moves relative to the wire.

Example 66. A medical method as shown and described herein.

Example 67. A medical device as shown and described herein.

What is claimed is:

1. A system, comprising:
a sheath;
an operation body attached to the sheath, the operation body including a first wall;
a clip configured to be inserted in and protruded from the sheath, the clip including a pair of arms;
a wire inserted in the sheath, the wire including a first end and a second end, the first end attached to the clip;
a handle attached to the second end and configured to move the wire against the operation body, the handle configured to open and close the pair of arms via the wire; and
an obstruction attached to the wire and configured to generate a sliding resistance to the wire,
wherein the handle is configured to change a configuration of the clip between a first configuration and a second configuration,
in the first configuration, the obstruction and the wire are placed in a relative position, the handle opens the arms, and the obstruction contacts the first wall, and
in the second configuration, the obstruction and the wire maintain the relative position, the handle closes the arms, and the obstruction is spaced apart from the first wall.

2. The system according to claim 1,
wherein the handle is configured to change a configuration of the clip from the first configuration to a third configuration, and
wherein the obstruction is configured to generate the sliding resistance from the first configuration to the third configuration,
wherein the first end of the wire in the third configuration is placed further than the first end of the wire in the first configuration relative to the obstruction while the obstruction contacts the first wall.

3. The system according to claim 1,
wherein the operation body includes a second wall,
wherein the handle is configured to change a configuration of the clip from the second configuration to a third configuration, and
wherein the obstruction is configured to generate the sliding resistance from the second configuration to the third configuration,
wherein the first end of the wire in the second configuration is placed further than the first end of the wire in the third configuration relative to the obstruction while the obstruction contacts the second wall.

4. The system according to claim 1,
wherein the handle is configured to change a configuration of the clip from a third configuration to the first configuration,
wherein the obstruction is configured to generate the sliding resistance from the third configuration to the first configuration,
wherein the first end of the wire in the first configuration is placed further than the first end of the wire in the third configuration relative to the obstruction while the obstruction contacts the first wall.

5. The system according to claim 4,
wherein the operation body includes a second wall,
wherein the handle is configured to change a configuration of the clip from the second configuration to a fourth configuration,
wherein the obstruction is configured to generate the sliding resistance from the second configuration to the fourth configuration,
wherein the first end of the wire in the second configuration is placed further than the first end of the wire in the fourth configuration relative to the obstruction while the obstruction contacts the second wall.

6. The system according to claim 1,
the wire includes a first wire and a second wire,
the first wire includes the first end and a third end, and
the second wire includes the second end and a fourth end; and
wherein the second wire has higher rigidity than the first wire, and the second wire is attached to the obstruction.

7. The system according to claim 6,
wherein the second wire is a cylinder.

8. The system according to claim 1,
wherein the obstruction is a ring shape and attached on a periphery of the wire.

9. The system according to claim 1,
wherein the operation body includes a second wall,
wherein the first wall and second wall are located inside the operation body and spaced apart in a longitudinal axis direction of the sheath, and
wherein the obstruction is placed at a space between the first wall and second wall.

10. The system according to claim 9,
wherein an amount of movement of the wire from the first configuration to the second configuration relative to the sheath in the longitudinal axis direction is substantially equal to a length of the space in the longitudinal axis direction.

11. The system according to claim 10,
wherein the amount of movement of the wire is shorter than the length of the space.

12. A method of using a treatment tool, the method comprising:
moving a wire and a first clip attached to the wire distally in a sheath;
protruding the first clip from the sheath;
opening a pair of arms of the first clip while an obstruction contacts a first wall of an operation body, the obstruction attached to the wire;

wherein the obstruction and the wire are placed in a relative position; and wherein the method comprises closing the pair of arms while the obstruction is spaced apart from the first wall of the operation body, wherein the obstruction and the wire are maintained in the relative position.

13. The method according to claim 12, comprising:

removing the first clip from the wire;

moving the wire distally relative to the obstruction;

attaching a second clip to the wire, wherein the obstruction generates a sliding resistance while the obstruction contacts the first wall.

14. The method according to claim 13, comprising:

inserting the second clip into the sheath;

moving the wire proximally relative to the obstruction while adding a force to the wire to overcome a sliding resistance between the obstruction and the wire.

15. The method according to claim 14, comprising:

reopening a pair of arms of the second clip while the obstruction contacts the first wall, wherein the obstruction and the wire are placed in the relative position; and reclosing the pair of arms of the second clip while the obstruction is spaced apart from the first wall, wherein the obstruction and the wire are maintained in the relative position.

16. The method according to claim 15, comprising:

moving the wire proximally relative to obstruction while adding a force to the wire beyond a sliding resistance between the obstruction and the wire; and removing the second clip from and the wire while the pair of the arms reclosing while the obstruction contacts a second wall of the operation body.

17. The method according to claim 12, wherein the operation body includes a second wall, and wherein an amount of movement of the wire between the opening and the closing is substantially equal to a length between the first wall and the second wall.

18. The use of treatment tool method according to claim 17, wherein the length of is longer than the amount of movement.

19. The method according to claim 12, wherein the obstruction is configured to generate a sliding resistance while the obstruction moves relative to the wire.

20. An applicator, comprising:

a sheath;

an operation body attached to the sheath, the operation body including a first wall;

a wire inserted in the sheath, the wire including a first end and a second end;

a handle attached to the second end and configured to move the wire against the operation body, the handle configured to move the wire forward and backward with respect to the sheath; and an obstruction attached to the wire and configured to generate a sliding resistance to the wire, wherein the handle is configured to change a configuration of the applicator between a first configuration and a second configuration, in the first configuration, the obstruction and the wire are placed in a relative position, and the obstruction contacts the first wall, and in the second configuration, the obstruction and the wire maintain the relative position, and the obstruction is spaced apart from the first wall.

* * * * *